(12) United States Patent
Lavallée et al.

(10) Patent No.: US 11,312,802 B2
(45) Date of Patent: Apr. 26, 2022

(54) COMPOSITIONS INCLUDING COPOLYMERS OF VINYLIDENE FLUORIDE AND TETRAFLUOROETHYLENE AND METHODS OF USING THE SAME

(71) Applicant: 3M INNOVATIVE PROPERTIES COMPANY, St. Paul, MN (US)

(72) Inventors: Claude Lavallée, Maplewood, MN (US); Dale E. Hutchens, Huntsville, AL (US); Harald Kaspar, Burgkirchen (DE); Karl D. Weilandt, Afton, MN (US); Shireen A. Mamun, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/302,539

(22) PCT Filed: May 17, 2017

(86) PCT No.: PCT/US2017/033049
§ 371 (c)(1),
(2) Date: Nov. 16, 2018

(87) PCT Pub. No.: WO2017/201135
PCT Pub. Date: Nov. 23, 2017

(65) Prior Publication Data
US 2019/0276656 A1  Sep. 12, 2019

Related U.S. Application Data

(60) Provisional application No. 62/337,492, filed on May 17, 2016.

(51) Int. Cl.
| | |
|---|---|
| C08L 27/16 | (2006.01) |
| C08F 214/22 | (2006.01) |
| B29C 48/27 | (2019.01) |
| C08L 23/08 | (2006.01) |
| C08L 77/00 | (2006.01) |
| B29C 48/95 | (2019.01) |
| B29C 48/00 | (2019.01) |
| B29K 27/12 | (2006.01) |

(52) U.S. Cl.
CPC ............ C08F 214/22 (2013.01); B29C 48/27 (2019.02); B29C 48/95 (2019.02); C08L 23/0815 (2013.01); C08L 27/16 (2013.01); C08L 77/00 (2013.01); *B29C 48/022* (2019.02); *B29K 2027/12* (2013.01); *C08L 2201/08* (2013.01); *C08L 2205/025* (2013.01); *C08L 2205/03* (2013.01); *C08L 2205/06* (2013.01)

(58) Field of Classification Search
CPC .............................. C08L 27/16; C08F 214/22
See application file for complete search history.

(56) References Cited

U.S. PATENT DOCUMENTS

| | | | |
|---|---|---|---|
| 2,968,649 | A | 1/1961 | Pailthorp |
| 3,051,677 | A | 8/1962 | Rexford |
| 3,318,854 | A | 5/1967 | Honn |
| 4,141,874 | A | 2/1979 | Oka |
| 4,535,113 | A | 8/1985 | Foster |
| 4,540,538 | A | 9/1985 | Corwin |
| 4,829,116 | A | 5/1989 | Piesold |
| 4,840,994 | A | 6/1989 | Moggi |
| 4,855,360 | A | 8/1989 | Duchesne |
| 4,904,735 | A | 2/1990 | Chapman, Jr. |
| 5,010,130 | A | 4/1991 | Chapman, Jr. |
| 5,013,792 | A | 5/1991 | Chapman, Jr. |
| 5,015,693 | A | 5/1991 | Duchesne |
| 5,061,759 | A | 10/1991 | Tommasi |
| 5,064,594 | A | 11/1991 | Priester |
| 5,089,200 | A | 2/1992 | Chapman, Jr. |
| 5,093,400 | A | 3/1992 | Arcella |
| 5,106,911 | A | 4/1992 | Chapman, Jr. |
| 5,132,368 | A | 7/1992 | Chapman, Jr. |
| 5,266,639 | A | 11/1993 | Chapman, Jr. |
| 5,284,184 | A | 2/1994 | Noone |
| 5,285,002 | A | 2/1994 | Grootaert |

(Continued)

FOREIGN PATENT DOCUMENTS

| | | |
|---|---|---|
| JP | 59-041348 | 3/1984 |
| JP | 59-127754 | 7/1984 |

(Continued)

OTHER PUBLICATIONS

Machine translation of JPS64-066261A (Year: 1989).*

(Continued)

*Primary Examiner* — Wenwen Cai
(74) *Attorney, Agent, or Firm* — Thomas M. Spielbauer; Kathleen B. Gross

(57) ABSTRACT

A composition includes a thermoplastic fluoropolymer having vinylidene fluoride units in an amount of at least 30 mole percent and tetrafluoroethylene units in an amount of at least 5 mole percent. The thermoplastic fluoropolymer is free of hexafluoropropylene units or comprises less than 5 mole percent hexafluoropropylene units. The composition further includes at least one of a non-fluorinated, thermoplastic polymer as a major component of the composition or a polymer processing additive synergist. A method of reducing melt defects during the extrusion of a polymer is also provided. Use of the thermoplastic fluoropolymer as a polymer processing additive is also provided.

19 Claims, No Drawings

(56) References Cited

U.S. PATENT DOCUMENTS

| | | | |
|---|---|---|---|
| 5,378,782 A | 1/1995 | Grootaert | |
| 5,397,829 A | 3/1995 | Morgan | |
| 5,442,097 A | 8/1995 | Obermeier | |
| 5,464,904 A | 11/1995 | Chapman, Jr. | |
| 5,527,858 A | 6/1996 | Blong | |
| 5,550,193 A | 8/1996 | Chiu | |
| 5,587,429 A | 12/1996 | Priester | |
| 5,710,217 A | 1/1998 | Blong | |
| 5,852,149 A * | 12/1998 | Abusleme | C08F 214/22 526/247 |
| 5,858,540 A | 1/1999 | Hayami | |
| 5,891,965 A | 4/1999 | Worm | |
| 6,255,535 B1 | 7/2001 | Schulz | |
| 6,255,536 B1 | 7/2001 | Worm | |
| 6,277,919 B1 | 8/2001 | Dillon | |
| 6,294,604 B1 | 9/2001 | Focquet | |
| 6,294,627 B1 | 9/2001 | Worm | |
| 6,380,313 B1 | 4/2002 | Dillon | |
| 6,599,982 B2 | 7/2003 | Oriani | |
| 6,613,941 B1 | 9/2003 | Felix | |
| 6,706,193 B1 | 3/2004 | Burkard | |
| 6,734,252 B1 | 5/2004 | Woods | |
| 6,780,481 B1 | 8/2004 | Lavallée | |
| 6,794,550 B2 | 9/2004 | Hintzer | |
| 6,818,695 B2 | 11/2004 | Dillon | |
| 6,894,118 B2 | 5/2005 | Chapman, Jr. | |
| 7,001,951 B2 | 2/2006 | Chapman, Jr. | |
| 7,018,541 B2 | 3/2006 | Hintzer | |
| 7,375,157 B2 | 5/2008 | Amos | |
| 7,420,010 B2 | 9/2008 | Sukhadia | |
| 7,488,838 B2 | 2/2009 | Daute | |
| 8,501,862 B2 | 8/2013 | Bonnet | |
| 9,938,402 B2 | 4/2018 | Byravan | |
| 2004/0192818 A1 | 9/2004 | Oriani | |
| 2005/0019584 A1 | 1/2005 | Tsuda | |
| 2005/0070644 A1 | 3/2005 | Tikuisis | |
| 2005/0101722 A1 | 5/2005 | Briers | |
| 2005/0245687 A1 | 11/2005 | Appel | |
| 2005/0281973 A1 | 12/2005 | Park | |
| 2009/0197028 A1 | 8/2009 | Lyons | |
| 2010/0311906 A1 | 8/2010 | Stevenson | |
| 2011/0172338 A1 | 7/2011 | Murakami | |
| 2011/0244159 A1 | 10/2011 | Papp | |
| 2012/0059102 A1 | 3/2012 | Cernohous | |
| 2017/0342245 A1 | 11/2017 | Lavallée | |
| 2018/0312673 A1 | 11/2018 | Lavallée | |

FOREIGN PATENT DOCUMENTS

| | | | |
|---|---|---|---|
| JP | S64-066261 A | * | 3/1989 |
| JP | H0 5295038 | | 11/1993 |
| WO | WO 94/26816 | | 11/1994 |
| WO | WO 2014-179432 | | 11/2014 |
| WO | WO 2015-042415 | | 3/2015 |
| WO | WO 2017-083688 | | 5/2017 |

OTHER PUBLICATIONS

Machine translation of JP H05295038. (Year: 1993).*

Ittel, "Late-Metal Catalysts for Ethylene Homo- and Copolymerization", Chemical Reviews, 2000, vol. 100, No. 04, pp. 1169-1203.

Logothetis, Prog. Polym. Sci., vol. 14, pp. 257-258 (1989).

Oleg Kulikov, Klaus Hornung, Manfred Wagner; *Low Viscous Hydrophilic Processing Additives for Extrusion of Polyethylene at Reduced Temperatures*; Polymer Engineering and Science (2010); 1237-1252.

Pianca et al., *Journal of Fluorine Chemistry*, 95 (1999), pp. 71 to 84).

Rauwendaal, C., "Polymer Extrusion", Hansen Publishers, p. 23-48, 1986.

R. F. Westover, Melt Extrusion, Encyclopedia of Polymer Science and Technology, vol. 8, pp. 573-581 (John Wiley & Sons 1968).

Woods, "The Influence of Polymer Process Aid and Hindered Amine Light Stabilizer Combinations in LLDPE Blown Film Applications—Part IIB", Polymer Processing Additives, 2000, No. 29, pp. 1-17.

Woods, "The Influence of Polymer Process Aid and Hindered Amine Light Stabilizer Combinations in LLDPE Blown Film Applications—Part IIA", Polymer Processing Additives, 2000, No. 28, pp. 1-9.

International Search Report for International Application No. PCT/US2017/033049, dated Aug. 8, 2017.

* cited by examiner

COMPOSITIONS INCLUDING COPOLYMERS OF VINYLIDENE FLUORIDE AND TETRAFLUOROETHYLENE AND METHODS OF USING THE SAME

CROSS-REFERENCE TO RELATED APPLICATION

This application is a national stage filing under 35 U.S.C. 371 of PCT/US2017/033049, filed May 17, 2017, which claims priority to U.S. Provisional Application No. 62/337,492, filed May 17, 2016, the disclosure of which is incorporated by reference in its entirety herein.

BACKGROUND

Extrusion of polymeric materials in the formation and shaping of articles is a major segment of the plastic or polymeric articles industry. The quality of the extruded article and the overall success of the extrusion process are typically influenced by the interaction of the fluid material with the extrusion die. For any melt-processable thermoplastic polymer composition, there exists a critical shear rate above which the surface of the extrudate becomes rough or distorted and below which the extrudate will be smooth. See, for example, R. F. Westover, Melt Extrusion, Encyclopedia of Polymer Science and Technology, vol. 8, pp. 573-81 (John Wiley & Sons 1968). The desire for a smooth extrudate surface competes with, and must be optimized with respect to, the economic advantages of extruding a polymer composition at the fastest possible speed (for example at high shear rates).

At low shear rates, defects in extruded thermoplastics may take the form of "sharkskin", which is a loss of surface gloss that in more serious manifestations appears as ridges running more or less transverse to the extrusion direction. At higher rates, the extrudate can undergo "continuous melt fracture" becoming grossly distorted. At rates lower than those at which continuous melt fracture is first observed, certain thermoplastics can also suffer from "cyclic melt fracture", in which the extrudate surface varies from smooth to rough.

There are other problems often encountered during the extrusion of thermoplastic polymers. They include a build-up of the polymer at the orifice of the die (known as die build up or die drool), high back pressure during extrusion runs, and excessive degradation or low melt strength of the polymer due to high extrusion temperatures. These problems slow the extrusion process either because the process must be stopped to clean the equipment or because the process must be run at a lower speed.

The addition of fluoropolymers can at least partially alleviate melt defects in extrudable thermoplastic polymers. Fluoropolymers that can be used as polymer processing additive include those described, for example, in U.S. Pat. Nos. 5,015,693 and 4,855,013 (Duchesne et al.), U.S. Pat. No. 6,277,919 (Dillon et al.), U.S. Pat. No. 6,734,252 (Woods), and U.S. Pat. No. 8,501,862 (Bonnet et al.), and in U.S. Pat. Appl. Pub. No. 2005/0101722 (Briers et al.)). The incorporation of acidic end groups has been proposed to be beneficial to the interaction between the polymer processing additive and the die wall. See, e.g., U.S. Pat. P Appl. Pub. No. 2011/0172338 (Murakami et al.) and U.S. Pat. No. 5,132,368 (Chapman et al.). On the other hand, acidity in the backbone has been proposed to be detrimental to chemical stability. See, e.g., U.S. Pat. No. 5,710,217 (Blong).

SUMMARY

We have found that polymer processing additives that provide a combination of desirable melt fracture clearance performance and have good chemical stability are challenging to achieve. The present disclosure provides fluorinated thermoplastic polymers that offer comparable melt fracture clearance performance to state-of-the-art amorphous vinylidene fluoride-hexafluoropropylene copolymers with similar melt viscosities. Advantageously, the fluorinated thermoplastic polymers disclosed herein tend to have greater chemical stability than these amorphous fluoropolymers. Additionally, the fluorinated polymers disclosed herein are thermoplastic, which offers processing advantages over amorphous fluoropolymers. The melt fracture clearance performance of the thermoplastic fluoropolymers disclosed herein is typically better than that of other base-resistant thermoplastic fluoropolymers.

In one aspect, the present disclosure provides a composition including at least one of a non-fluorinated thermoplastic polymer as a major component of the composition or a polymer processing additive synergist. The composition further includes a thermoplastic fluoropolymer having vinylidene fluoride units in an amount of at least 30 mole percent and tetrafluoroethylene units in an amount of at least 5 mole percent. The thermoplastic fluoropolymer is free of hexafluoropropylene units or comprises less than 5 mole percent hexafluoropropylene units. In some embodiments, the composition includes the non-fluorinated thermoplastic polymer. In some embodiments, the composition includes the polymer processing additive synergist. In some embodiments, the composition includes both the non-fluorinated thermoplastic polymer and the polymer processing additive synergist.

In another aspect, the present disclosure provides a method of reducing melt defects in a non-fluorinated thermoplastic polymer. The method includes combining the non-fluorinated, thermoplastic polymer and thermoplastic fluoropolymer having vinylidene fluoride units in an amount of at least 30 mole percent and tetrafluoroethylene units in an amount of at least 5 mole percent to provide a composition according to the present disclosure. The method can include extruding the composition.

In another aspect, the present disclosure provides the use of a thermoplastic fluoropolymer having vinylidene fluoride units in an amount of at least 30 mole percent and tetrafluoroethylene units in an amount of at least 5 mole percent as a polymer processing additive. The thermoplastic fluoropolymer is free of hexafluoropropylene units or comprises less than 5 mole percent hexafluoropropylene units.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

The term "perfluoroalkyl group" includes linear, branched, and/or cyclic alkyl groups in which all C—H bonds are replaced by C—F bonds.

The phrase "interrupted by one or more —O— groups", for example, with regard to an alkyl, alkylene, or arylalkylene refers to having part of the alkyl, alkylene, or arylalkylene on both sides of the one or more —O— groups. An example of an alkylene that is interrupted with one —O— group is —CH$_2$—CH$_2$—O—CH$_2$—CH$_2$—.

The term "aryl" as used herein includes carbocyclic aromatic rings or ring systems, for example, having 1, 2, or 3 rings, optionally containing at least one heteroatom (e.g., O, S, or N) in the ring, and optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, oxazolyl, and thiazolyl. "Arylalkylene" refers to an "alkylene" moiety to which an aryl group is attached. "Alkylarylene" refers to an "arylene" moiety to which an alkyl group is attached.

By 'synergist' is meant a compound that allows the use of a lower amount of the fluoropolymer as a polymer processing additive while achieving essentially the same improvement in extrusion and processing properties of the extrudable polymer as if a higher amount of the fluoropolymer polymer processing additive was used.

It should be understood that the term "polymer processing additive synergist" per se, as used herein, does not include a fluoropolymer or the non-fluorinated thermoplastic polymer. In other words, a polymer processing additive synergist per se does not include the polymer processing additive or the host polymer.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

Various aspects and advantages of embodiments of the present disclosure have been summarized. The above Summary is not intended to describe each illustrated embodiment or every implementation of the present disclosure.

DETAILED DESCRIPTION

Although vinylidene fluoride has been suggested to produce acidic hydrogens in polymer backbones, which may lead to chemical instability (see, e.g., U.S. Pat. No. 5,710, 217), we have found that of the thermoplastic fluoropolymers disclosed herein, having at least 30 mole percent vinylidene fluoride units and being free of hexafluoropropylene units or having less than 5 mole percent hexafluoropropylene units, may offer improved chemical stability over state-of-the-art amorphous vinylidene fluoride-hexafluoropropylene (VDF-HFP) copolymers and thermoplastic tetrafluoroethylene-hexafluoropropylene-vinylidene fluoride (TFE-HFP-VDF) copolymers.

For example, in some embodiments, the composition according to the present disclosure and/or useful for practicing the method disclosed herein is lighter in color after exposure to vapors from a 28% ammonia solution for 18 hours than a comparable composition that is the same as the composition except that it includes a VDF-HFP or TFE-HFP-VDF copolymer instead of the thermoplastic fluoropolymer. A comparable composition includes the same non-fluorinated polymer and the same amount of additives (e.g., antioxidants, synergists, and stabilizers) but a different fluoropolymer as a polymer processing additive. As shown in Table 7, a linear low density polyethylene master batch including a poly(ethylene glycol) synergist and Example 4, which includes VDF-TFE copolymer Preparative Example 3, discolors less after exposure to the vapors from a 28% ammonia solution for 18 hours in a desiccator jar than Comparative Example 2, which includes a polymer processing additive obtained from 3M Company under the trade designation "3M Dynamar Polymer Processing Additive FX 9613" and a poly(ethylene glycol) synergist. Polymer processing additive "3M Dynamar Polymer Processing Additive FX 9613" includes a VDF-HFP copolymer. Also, as shown in Table 7, Example 4, which includes Preparative Example 3, discolors less after exposure to the vapors from a 28% ammonia solution than Comparative Example 4, which includes a polymer processing additive obtained from 3M Company under the trade designation "3M Dynamar Polymer Processing Additive FX 5911" and a poly(ethylene glycol) synergist. Polymer processing additive "3M Dynamar Polymer Processing Additive FX 5911" includes a TFE-HFP-VDF copolymer.

It is desirable that polymer processing additives be stable under basic conditions. Basic components can be present in otherwise neutral extrudable polymers. For example, Hindered Amine Light Stabilizers (HALS), can be added to polyolefin formulations. We have observed that HALS affect the performance of some commercially available polymer processing additives under some process conditions. Polymer processing additives that are stable under basic conditions can also be useful in inherently basic resins, such as polyamides, and when the extruded material is used to package alkaline products. Base instability can be exacerbated by the presence of poly(ethylene glycol).

The composition, method, and use according to the present disclosure include a thermoplastic fluoropolymer comprising vinylidene fluoride units in an amount of at least 30 mole percent and tetrafluoroethylene units in an amount of at least 5 mole percent. In some embodiments, the amount of the vinylidene fluoride units is in a range from 30 mole percent to 95 mole percent, and the amount of the tetrafluoroethylene units is in a range from 5 mole percent to 70 mole percent. The amount of the vinylidene fluoride units in the fluoropolymer can be in a range from 30 mole percent to 95 mole percent, from 55 mole percent to 90 mole percent, or from 70 mole percent to 90 mole percent. In some of these embodiments, the amount of the tetrafluoroethylene units is in a range from 5 mole percent to 70 mole percent, 10 mole percent to 45 mole percent, or from 10 mole percent to 30 mole percent.

Thermoplastic fluoropolymers in the compositions according to the present disclosure and/or useful for practicing the present disclosure are semi-crystalline. They are typically melt-processable per se and exhibit a melting point and/or glass transition temperature above ambient temperature. The thermoplastic fluoropolymers can have a melting point in a range from 40° C. to 300° C., 100° C. to 200° C., or 100° C. to 160° C. In some embodiments, the thermoplastic fluoropolymers can have a fluorine atom-to-carbon atom ratio of at least 1:2, in some embodiments at least 1:1.5. Thermoplastic fluoropolymers may offer processing advantages over amorphous fluoropolymers. For example, thermoplastic fluoropolymers need not be ground and may not require the use of a partitioning agent.

The melting point of vinylidene fluoride-tetrafluoroethylene copolymers can be adjusted with the ratio of the monomeric units. In some embodiments, the melting point of the thermoplastic fluoropolymer is up to 130° C. The melting point of the thermoplastic fluoropolymer may be in a range from 100° C. to 130° C., 110° C. to 130° C., or 120° C. to 130° C. Thermoplastic fluoropolymers having a melting point in any of these ranges may be useful, for example, in a composition in which the host polymer is a polyolefin. Melting points in any of these ranges may be achieved, for example, when tetrafluoroethylene units are present in the thermoplastic fluoropolymer in a range from 10 mole percent to 30 mole percent, 15 mole percent to 25 mole percent, or about 20 mole percent. In some embodiments, the melting point of the thermoplastic fluoropolymer is at least 130° C. The melting point may of the thermoplastic fluoropolymer may be in a range from 130° C. to 170° C., 135° C. to 165° C., or 140° C. to 160° C. Thermoplastic fluoropolymers having a melting point in any of these ranges may be useful, for example, in a composition in which the host polymer is a polyamide. Melting points in any of these ranges may be achieved, for example, when tetrafluoroethylene units are present in the thermoplastic fluoropolymer in a range from 5 mole percent to 10 mole percent, 30 mole percent to 45 mole percent, or 30 mole percent to 40 mole percent.

Thermoplastic fluoropolymers in the compositions according to the present disclosure and/or useful for practicing the present disclosure are random copolymers. Generally, each of the polymer chains includes both vinylidene fluoride units and tetrafluoroethylene units. The polymerization method, described below, is generally not carried out in a way to exclude tetrafluoroethylene from at least some of the polymer chains. As shown in the Examples, below, tetrafluoroethylene is present in the precharge and in the feed during the polymerization process. Accordingly, the thermoplastic fluoropolymer would not be considered a "heterogeneous PVDF" under the definition in U.S. Pat. No. 8,501,862 (Bonnet et al.)

The thermoplastic fluoropolymer in the composition according to the present disclosure is free of hexafluoropropylene units or comprises less than 5 mole percent hexafluoropropylene units. In some embodiments, the thermoplastic fluoropolymer comprises up to 4, 3, 2, 1, or 0.5 mole percent hexafluoropropylene units. Polymers that include vinylidene fluoride and hexafluoropropylene units include diads represented by formula —$CF_2$—$CF(CF_3)$—$CH^*(H)$—$CF_2$—. Without wishing to be bound be theory, it is believed that the acidic hydrogen or hydrogens in the diad —$CF_2$—$CF(CF_3)$—$CH^*(H)$—$CF_2$—, indicated with the asterisk, can promote adhesion to the die metal during extrusion, which can delay the onset of melt fracture or reduce the time to clear melt fracture. However, these acidic hydrogens are also known to be chemically reactive. The acidic hydrogens can react when bases are present in the composition to be extruded or when the non-fluorinated polymer to be extruded is itself basic.

In some embodiments, the vinylidene fluoride units and the tetrafluoroethylene units are present in the thermoplastic fluoropolymer a combined amount of at least 95 mole percent, based on the total moles of the thermoplastic fluoropolymer. In some embodiments, the vinylidene fluoride units and the tetrafluoroethylene units are present in the thermoplastic fluoropolymer a combined amount of at least 99 mole percent, based on the total moles of the thermoplastic fluoropolymer. In some embodiments, the thermoplastic fluoropolymers in the compositions according to the present disclosure and/or useful for practicing the present disclosure consist of vinylidene fluoride units and tetrafluoroethylene units.

Thermoplastic fluoropolymers useful for practicing the present disclosure can further comprise interpolymerized units derived from at least one partially fluorinated or perfluorinated ethylenically unsaturated monomer represented by formula $R^aCF{=}CR^a{}_2$, wherein each $R^a$ is independently fluoro, chloro, bromo, hydrogen, a fluoroalkyl group (e.g. perfluoroalkyl having from 1 to 8, 1 to 4, or 1 to 3 carbon atoms, optionally interrupted by one or more oxygen atoms), a fluoroalkoxy group (e.g. perfluoroalkoxy having from 1 to 8, 1 to 4, or 1 to 3 carbon atoms, optionally interrupted by one or more oxygen atoms), alkyl or alkoxy of from 1 to 8 carbon atoms, aryl of from 1 to 8 carbon atoms, or cyclic saturated alkyl of from 1 to 10 carbon atoms. Examples of useful fluorinated monomers represented by formula $R^aCF{=}CR^a{}_2$ include chlorotrifluoroethylene, 2-chloropentafluoropropene, dichlorodifluoroethylene, 1,1-dichlorofluoroethylene, 1-hydropentafluoropropylene, 2-hydropentafluoropropylene, perfluoroalkyl perfluorovinyl ethers, perfluoroalkyl perfluoroallyl ethers, and mixtures thereof. Examples of useful perfluoroalkyl perfluorovinyl ethers, perfluoroalkoxyalkyl vinyl ethers, perfluoroalkyl perfluoroallyl ethers, and perfluoroalkoxyalkyl allyl ethers are described below. Thermoplastic fluoropolymers useful for practicing the present disclosure may also comprise interpolymerized units derived from the interpolymerization of TFE and VDF with at least one non-fluorinated, copolymerizable comonomer represented by formula $R^b{}_2C{=}CR^b{}_2$, wherein each $R^b$ is independently hydrogen, chloro, alkyl having from 1 to 8, 1 to 4, or 1 to 3 carbon atoms, a cyclic saturated alkyl group having from 1 to 10, 1 to 8, or 1 to 4 carbon atoms, or an aryl group of from 1 to 8 carbon atoms. Examples of useful monomers represented by formula $R^b{}_2C{=}CR^b{}_2$ include ethylene and propylene. Perfluoro-1,3-dioxoles may also be useful to prepare the thermoplastic fluoropolymer disclosed herein. Perfluoro-1,3-dioxole monomers and their copolymers are described in U.S. Pat. No. 4,558,141 (Squires). In some embodiments, the thermoplastic fluoropolymer further comprises units selected from chlorotrifluoroethylene units, 1-hydropentafluoropropylene units, 2-hydropentafluoropropylene units, and propylene units. Units other than vinylidene fluoride units and tetrafluoroethylene units, including any of those described above, may be present in the thermoplastic fluoropolymer in an amount up to 20, 15, 10, 5, 4, 3, 2, or 1 mole percent, based on the total amount of the thermoplastic fluoropolymer.

In some embodiments, the thermoplastic fluoropolymer useful for practicing the present disclosure includes long-chain branching. Such fluoropolymers are prepared by using modifiers such as bisolefins or halogen containing monoolefins during the polymerization reaction. See, for example, U.S. Pat. Appl. Pub. No. 2010/0311906 (Lavallée et al.) and U.S. Pat. No. 7,375,157 (Amos et al.), respectively. Fluoropolymers with long-chain branching can effectively reduce melt fracture during extrusion and tend to be dispersed better in extrudable polymers than fluoropolymers having similar melt viscosities and a linear chain topography.

Thermoplastic fluoropolymers as described above can be made using conventional methods. Thermoplastic fluoropolymers useful for practicing the present disclosure, including those described in any of the above embodiments, are typically prepared by a sequence of steps, which can include polymerization, coagulation, washing, and drying. In some embodiments, an aqueous emulsion polymerization can be carried out continuously under steady-state conditions. For example, an aqueous emulsion of monomers (e.g., including any of those described above), water, emulsifiers, buffers and catalysts can be fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent latex by vaporization at reduced pressure. The fluoropolymer can be recovered from the latex by coagulation.

The polymerization is generally conducted in the presence of a free radical initiator system, such as ammonium persulfate, potassium permanganate, AIBN, or bis(perfluoroacyl) peroxides. The polymerization reaction may further include other components such as chain transfer agents and complexing agents. The polymerization is generally carried out at a temperature in a range from 10° C. and 100° C., or in a range from 30° C. and 80° C. The polymerization pressure is usually in the range of 0.3 MPa to 30 MPa, and in some embodiments in the range of 2 MPa and 20 MPa.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al. and U.S. Pat. No. 7,018,541 to Hintzer et al. In some embodiments, the polymerization process may be conducted with no emulsifier (e.g., no fluorinated emulsifier). Polymer particles produced without an emulsifier typically have an average diameter, as determined by dynamic light scattering techniques, in a range of about 40 nm to about 500 nm, typically in range of about 100 nm to about 400 nm, and suspension polymerization will typically produce particles sizes up to several millimeters.

In some embodiments, a water soluble initiator can be useful to start the polymerization process. Salts of peroxy sulfuric acid, such as ammonium persulfate, are typically applied either alone or sometimes in the presence of a reducing agent, such as bisulfites or sulfinates (e.g., fluorinated sulfinates disclosed in U.S. Pat. Nos. 5,285,002 and 5,378,782 both to Grootaert) or the sodium salt of hydroxy methane sulfinic acid (sold under the trade designation "RONGALIT", BASF Chemical Company, New Jersey, USA). Most of these initiators and emulsifiers have an optimum pH-range where they show most efficiency. For this reason, buffers are sometimes useful. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium.

Aqueous polymerization using the initiators described above will typically provide thermoplastic fluoropolymers with polar end groups; (see, e.g., Logothetis, Prog. Polym. Sci., Vol. 14, pp. 257-258 (1989)). If desired, such as for improved processing or increased chemical stability, the presence of strong polar end groups such as $SO_3^{(-)}$ and $COO^{(-)}$ can be reduced in the thermoplastic fluoropolymer through known post treatments (e.g., decarboxylation, postfluorination). Chain transfer agents of any kind can significantly reduce the number of ionic or polar end groups. The strong polar end groups can be reduced by these methods to any desired level. In some embodiments, the number of polar functional end groups (e.g., —COF, —$SO_2F$, —$SO_3M$, —COO-alkyl, and —COOM, wherein alkyl is $C_1$-$C_3$ alkyl and M is hydrogen or a metal or ammonium cation), is reduced to less than or equal to 300, 200, 100, or 50 per $10^6$ carbon atoms. In some embodiments, it may be useful to select initiators and polymerization conditions to achieve at least 300 polar functional end groups (e.g., —COF, —$SO_2F$, —$SO_3M$, —COO-alkyl, and —COOM, wherein alkyl is $C_1$-$C_3$ alkyl and M is hydrogen or a metal or ammonium cation) per $10^6$ carbon atoms, 400 per $10^6$ carbon atoms, or at least 500 per $10^6$ carbon atoms for the thermoplastic fluoropolymer. When the thermoplastic fluoropolymer has at least 300, 400, or 500 polar functional end groups per $10^6$ carbon atoms, the thermoplastic fluoropolymer may have increased interaction with a metal die surface as described in U.S. Pat. No. 5,132,368 (Chapman et al.) or may provide a melt-processable resin with improved moldability as described in U.S. Pat. Appl. No. 2011/0172338 (Murakami et al.). The number of polar end groups can be determined by known techniques such as infrared spectroscopy and nuclear magnetic resonance spectroscopy (see, e.g., Pianca et al., *Journal of Fluorine Chemistry*, 95 (1999), pp. 71 to 84).

The number of polar end groups in a fluoropolymer can also be evaluated by measuring acid value using titration with potassium hydroxide. A method for determining acid value is provided in the Examples, below. Acid value can be reported as mg KOH per gram of fluoropolymer. In some embodiments, thermoplastic polymers useful for practicing the present disclosure have an acid value of up to or less than 1 mg KOH/g, up to 0.9 mg KOH/g, up to 0.8 mg KOH/g, up to 0.75 mg KOH per gram, up to 0.7 mg KOH/g, up to 0.6 mg KOH/g, or up to or less than 0.5 mg KOH/g. In embodiments in which a mixture of thermoplastic fluoropolymers are used in the compositions and methods disclosed herein, at least one of the thermoplastic fluoropolymers has an acid value in any of these amounts. Such thermoplastic fluoropolymers may have improved chemical stability and provide a lower time to clear melt fracture than thermoplastic fluoropolymers having acid numbers above 1.0 mg KOH/g. In other embodiments, thermoplastic polymers useful for practicing the present disclosure have an acid value of at least 1 mg KOH/g, at least 1.25 mg KOH/g, at least 1.5 mg KOH/g, or at least 1.75 mg KOH/g. In embodiments in which a mixture of thermoplastic fluoropolymers are used in the compositions and methods disclosed herein, at least one of the thermoplastic fluoropolymers has an acid value in any of these amounts.

Chain transfer agents and any long-chain branching modifiers described above can be fed into the reactor by batch charge or continuously feeding. Because feed amount of chain transfer agent and/or long-chain branching modifier is relatively small compared to the monomer feeds, continuous feeding of small amounts of chain transfer agent and/or long-chain branching modifier into the reactor can be achieved by blending the long-chain branding modifier or chain transfer agent in one or more monomers.

To coagulate the obtained fluoropolymer latex, any coagulant which is commonly used for coagulation of a fluoropolymer latex may be used, and it may, for example, be a water soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in range of 0.001 to 20 parts by mass, for example, in a range of 0.01 to 10 parts by mass per 100 parts by mass of the fluoropolymer latex. Alternatively or additionally, the fluoropolymer latex may be frozen for coagulation. The coagulated fluoropolymer can be collected by filtration and washed with water. The washing water may, for example, be ion exchanged water, pure water or ultrapure water. The amount of the washing water may be from 1 to 5 times by mass to the fluoropolymer, whereby the amount of the emulsifier attached to the fluoropolymer can be sufficiently reduced by one washing.

Adjusting, for example, the concentration and activity of the initiator, the concentration of each of the reactive monomers, the temperature, the concentration of the chain transfer agent, and the solvent using techniques known in the art can control the molecular weight of the thermoplastic fluoropolymer. The molecular weight of a thermoplastic fluoropolymer relates to its melt viscosity. In some embodiments, the log [zero shear viscosity/1 Pascal·second (Pa·s)] of the thermoplastic fluoropolymer, measured according to the procedure described in the Examples below, is at least 4 and up to 11 or at least 5 and up to 10. In some embodiments, the log [zero shear viscosity/1 Pascal·second (Pa·s)] of the thermoplastic fluoropolymer is at least 6 and up to 9. Fluoropolymers useful for practicing the present disclosure typically have a distribution of molecular weights and compositions.

In some embodiments, the thermoplastic fluoropolymer useful for practicing the present disclosure has a multimodal molecular weight distribution. "Multimodal" as used herein means that a fluoropolymer has at least two components of discrete and different molecular weights. A multimodal thermoplastic fluoropolymer can be achieved in a number of ways, for example, by means of a suitable polymerization process (e.g., step polymerization). A step polymerization employs the use of specific initiators and chain transfer agents such as any of those described above. At the beginning of the polymerization, relatively little initiator and relatively little chain transfer agent are charged to the reaction vessel for a desired first molecular weight. As the polymerization proceeds, additional initiator and chain transfer agent are charged to the reaction vessel. The exact timing and quantity of these charges will affect the polymerization conditions and permit the operator to produce a polymer having the desired characteristics. For example, after 50% of the starting monomers have been added, the further addition of appropriate amounts of initiator and chain transfer agent can be used to change the polymerization conditions and produce a polymer with a desired lower molecular weight. A desired lower molecular weight can also be achieved by increasing the temperature during the polymerization. In this way, a thermoplastic fluoropolymer having a bimodal or multimodal molecular weight distribution can be made.

A multimodal thermoplastic fluoropolymer may also be made by mixing either the latexes or the powder products of the separate components. In some embodiments, a blend of two thermoplastic fluoropolymers is prepared by mixing the latexes of the fluoropolymers (so-called latex blending) and subsequently finishing the mixture by co-coagulation using any of the methods described above. The thermoplastic fluoropolymers having different molecular weights may also be combined in the non-fluorinated thermoplastic polymer as described in further detail, below.

In some cases, a blend of thermoplastic fluoropolymers having two different log [zero shear viscosity/1 Pascal·second (Pa·s)] values is more effective in reducing melt defects during the extrusion of a non-fluorinated host polymer than either one of the thermoplastic fluoropolymers on its own. For example, Example 13, which includes a mixture of VDF-TFE copolymers having different melt viscosities reduces the time to clear melt fracture in comparison to either of VDF-TFE copolymers on its own.

In some embodiments of the compositions and methods according to the present disclosure, the thermoplastic fluoropolymer can be used in combination with a polymer processing additive synergist. In some embodiments, the polymer processing additive synergist comprises at least one of poly(oxyalkylene) polymer, a silicone-polyether copolymer; an aliphatic polyester such as poly(butylene adipate), poly(lactic acid) and polycaprolactone polyesters; a polytetrafluoroethylene (e.g., a polytetrafluoroethylene micropowder), an aromatic polyester such as phthalic acid diisobutyl ester, or a polyether polyol. Blends of any of these classes of synergists may be useful. Also, block copolymers including blocks of two or more of these classes of synergists may be useful. For examples, the polymer processing additive synergist may be silicone-polycaprolactone block copolymer or a poly(oxyalkylene)-polycaprolactone block copolymer. In some embodiments, the polymer processing additive synergist comprises at least one of polycaprolactone or a poly (oxyalkylene).

Poly(oxyalkylene) polymers and other synergists may be selected for their performance in polymer processing additive blends. The poly(oxyalkylene) polymer or other synergist may be selected such that it (1) is in the liquid state (or molten) at a desired extrusion temperature and (2) has a lower melt viscosity than both the host polymer and the polymer processing additive. In some embodiments, it is believed the poly(oxyalkylene) polymer or other synergist associates with the surface of the polymer processing additive particles in extrudable compositions. For example, although not wishing to be bound by theory, the poly (oxyalkylene) polymer or other synergist may wet the surfaces of the polymer processing additive particles in extrudable compositions.

Poly(oxyalkylene) polymers useful as polymer processing additive synergists can be represented by formula $A[(OR^1)_xOR^2]_y$, wherein A is typically alkylene interrupted by one or more ether linkages, y is 2 or 3, $(OR^1)_x$ is a poly(oxyalkylene) chain having a plurality (x) of oxyalkylene groups, $OR^1$, wherein each $R^1$ is independently $C_2$ to $C_5$ alkylene, in some embodiments, $C_2$ to $C_3$ alkylene, x is about 3 to 3000, $R^2$ is hydrogen, alkyl, aryl, arylalkenyl, alkylarylenyl, —C(O)-alkyl, —C(O)-aryl, —C(O)-arylalkenyl, or —C(O)-alkylarylenyl, wherein —C(O)— is bonded to the 0 of $OR^2$. The variable "x" is selected such that molecular weight of the poly(oxyalkylene) polymer is in a range from about 200 to about 20,000 grams per mole (g/mol) or higher, in some embodiments about 400 to about 15,000 g/mol. In some embodiments, x is in a range from 5 to 1000 or 10 to 500. The poly(oxyalkylene) polymer chain can be a homopolymer chain such as poly(oxyethylene) in which each $R^1$ is —$CH_2CH_2$—, or poly(oxypropylene), in which each $R^1$ is —$C_3H_6$—. Or the poly(oxyalkylene) polymer chain can be a chain of randomly distributed oxyalkylene groups (e.g., a copolymer —$OC_2H_4$— and —$OC_3H_6$— units) or having alternating blocks of repeating oxyalkylene groups (e.g., a polymer comprising (—$OC_2H_4$—)$_a$ and (—$OC_3H_6$—)$_b$ blocks, wherein a+b is in a range from 5 to 5000 or higher, in some embodiments, 10 to 500. In some embodiments, A is ethylene, —$CH_2$—CH(–)—$CH_2$-(derived from glycerol), $CH_3CH_2C(CH_2$—)$_3$ (derived from 1,1,1-trimethylol propane), poly(oxypropylene), —$CH_2CH_2$—O—$CH_2CH_2$—, or —$CH_2CH_2$—O—$CH_2CH_2$—O—$CH_2CH_2$—. In some embodiments, $R^2$ is hydrogen, methyl, butyl, phenyl, benzyl, acetyl, benzoyl, or stearyl. Other useful poly(oxyalkylene) polymers are polyesters prepared, for example, from dicarboxylic acids and poly(oxyalkylene) polymers represented by formula A[(OR$^1$)$_x$OR$^2$]$_y$, wherein A, R$^1$, and x are as defined above, $R^2$ is hydrogen, and y is 2. Typically, the major proportion of the poly(oxyalkylene) polymer by weight will be the repeating oxyalkylene groups, (OR$^1$).

In some embodiments, the poly(oxyalkylene) polymers useful as polymer processing additive synergist are polyethylene glycols and their derivatives. Polyethylene glycol (PEG) can be represented by formula H(OC$_2$H$_4$)$_{x'}$OH, where x' is about 15 to 3000. Many of these polyethylene glycols, their ethers, and their esters are commercially available from a variety of sources. Polyethylene glycol-polycaprolactone block copolymers may also be useful.

While the thermoplastic fluoropolymer useful for practicing the present disclosure can be used in combination with a polymer processing additive synergist, the examples below show that a thermoplastic fluoropolymer described herein is effective as a polymer processing additive in the absence of a synergist. Accordingly, the compositions according to the present disclosure can be essentially free of a polymer processing additive synergist, including any of those described above. "Essentially free of a polymer processing additive synergist" can refer to compositions including a polymer processing additive synergist but in an amount that may be ineffective for improving the melt fracture performance during an extrusion when the polymer processing additive composition is included in a host resin. In some embodiments, the polymer processing additive composition may include up to or less than 1, 0.5, 0.25, or 0.1 percent by weight of a polymer processing additive synergist. Being "essentially free of a polymer processing additive synergist" can include being free of a polymer processing additive synergist.

In embodiments in which the composition according to the present disclosure is includes a polymer processing additive synergist, typically, the composition comprises between about 5 and 95 weight percent of the synergist and 95 and 5 weight percent of the thermoplastic fluoropolymer. The ratio of the thermoplastic fluoropolymer to the synergist component in the polymer processing additive can be from 2:1 to 1:10, in some embodiments 1:1 to 1:5.

In embodiments in which the composition according to or useful for practicing the present disclosure includes a poly (oxyalkylene) synergist, it may be useful for the composition to include a metal salt of a carboxylic acid, sulfonic acid, or alkylsulfate for thermally stabilizing the poly(oxyalkylene) polymer. In some embodiments, the metal salt is a metal salt of a carboxylic acid or a sulfonic acid. Carboxylic acids and sulfonic acids may be monofunctional or multifunctional (e.g., difunctional) and may be aliphatic or aromatic. In other words, the carbonyl carbon or sulfonyl sulfur may be attached to an aliphatic group or aromatic ring. Aliphatic carboxylic acids and sulfonic acids may be saturated or unsaturated. In addition to the one or more —C(O)O$^-$ or —S(O)$_2$O$^-$ anions (i.e., carboxylate or sulfonate groups, respectively), the aliphatic or aromatic group may also be substituted by other functional groups including halogen (i.e., fluoro, chloro, bromo, and iodo), hydroxyl, and alkoxy groups, and aromatic rings may also be substituted by alkyl groups. In some embodiments, the carboxylic acid or sulfonic acid is monofunctional or difunctional and aliphatic, without any further substituents on the aliphatic chain. In some embodiments, the carboxylic acid is a fatty acid, for example, having an alkyl or alkenyl group with about 8 to 30 (in some embodiments, 8 to 26 or 8 to 22) carbon atoms. The common names of the fatty acids having from eight to twenty six carbon atoms are caprylic acid (C$_8$), capric acid (C$_{10}$), lauric acid (C$_{12}$), myristic acid (C$_{14}$), palmitic acid (C$_{16}$), stearic acid (C$_{18}$), arachidic acid (C$_{20}$), behenic acid (C$_{22}$), lignoceric acid (C$_{24}$), and cerotic acid (C$_{26}$). Fatty acid metal salts of these acids may be caprylate, caprate, laurate, myristate, palmitate, stearate, arachidate, behenate, lignocerate, and cerotate salts, in some embodiments. In some embodiments the carboxylic acid is other than stearic acid. Examples of useful metal cations in the metal salt of a carboxylic acid, sulfonic acid, or alkylsulfate include aluminum (Al), calcium (Ca), magnesium (Mg), zinc (Zn), barium (Ba), lithium (Li), sodium (Na), and potassium (K). In some embodiments, the metal salt is a sodium or potassium salt. In some embodiments, the metal salt is a zinc or calcium salt. Examples of metal salts of a carboxylic acid, sulfonic acid, or alkylsulfate useful for thermally stabilizing a poly(oxyalkylene) polymer in compositions and methods according to the present disclosure include calcium stearate, zinc stearate, barium stearate, aluminum stearate, potassium stearate, magnesium stearate, sodium stearate, zinc acetate, sodium acetate, sodium caprylate, sodium laurate, sodium behenate, sodium 1-decane sulfonate, sodium lauryl sulfate, and zinc phthalate. In some embodiments, the metal salt is other than calcium stearate or zinc stearate. In some embodiments, the metal salt is other than calcium stearate. For more information regarding such metal salts and their ability to stabilize a poly(oxyalkylene) polymer, see Int. Pat. Appl. Publ. No. WO2015/042415 (Lavallée et al.).

In some embodiments, the thermoplastic fluoropolymer disclosed herein can be used in combination with a silicone-containing polymer or another fluoropolymer polymer processing additive (e.g., another semicrystalline fluoropolymer or an amorphous fluoropolymer). Semicrystalline fluoropolymers that are useful for at least partially alleviating melt defects in extrudable thermoplastic polymers and can be used in combination with the thermoplastic fluoropolymer disclosed herein include those described, for example, in U.S. Pat. No. 5,527,858 (Blong et al.) and U.S. Pat. No. 6,277,919 (Dillon et al.). Some useful semicrystalline fluoropolymers include copolymers of vinylidene fluoride, tetrafluoroethylene, and hexafluoropropylene and are commercially available from 3M Company under the trade designations "DYNAMAR FX 5911", and "DYNAMAR FX 5912" and fluoropolymers available from Arkema, Colombes, France, under the trade designation "KYNAR" in various grades. Silicones that are useful for at least partially alleviating melt defects in extrudable thermoplastic polymers and can be used in combination with the thermoplastic fluoropolymer disclosed herein include polysiloxanes described, for example, in U.S. Pat. No. 4,535,113 (Foster et al.), polydiorganosiloxane polyamide block copolymers and polydiorganosiloxane polyoxamide block copolymers described, for example, in U.S. Pat. App. Pub. No. 2011-

0244159 (Papp et al.), and silicone-polyurethane copolymers described, for example, in Int. Pat. Appl. Publ. No. WO2015/042415 (Lavallée et al.). Some silicone polymer processing additives are commercially available, for example, from Dow Corning, Midland, Mich., under the trade designation "DOW CORNING MB50-002" and Wacker Chemie AG, Munich, Germany, under the trade designation "GENIOPLAST".

In some embodiments, the composition according to the present disclosure and/or useful in the method according to the present disclosure further comprises an amorphous fluoropolymer. Amorphous fluoropolymers typically do not exhibit a melting point. They typically have glass transitions temperatures below room temperature and exhibit little or no crystallinity at room temperature. Amorphous fluoropolymers useful as polymer processing additives include homopolymers and/or copolymers of fluorinated olefins. In some embodiments, the homopolymers or copolymers can have a fluorine atom-to-carbon atom ratio of at least 1:2, in some embodiments at least 1:1; and/or a fluorine atom-to-hydrogen atom ratio of at least 1:1.5.

Amorphous fluoropolymers useful for practicing the present disclosure can comprise interpolymerized units derived from at least one partially fluorinated or perfluorinated ethylenically unsaturated monomer represented by formula $R^aCF{=}CR^a{}_2$, wherein each $R^a$ is independently fluoro, chloro, bromo, hydrogen, a fluoroalkyl group (e.g. perfluoroalkyl having from 1 to 8, 1 to 4, or 1 to 3 carbon atoms), a fluoroalkoxy group (e.g. perfluoroalkoxy having from 1 to 8, 1 to 4, or 1 to 3 carbon atoms, optionally interrupted by one or more oxygen atoms), alkyl or alkoxy of from 1 to 8 carbon atoms, aryl of from 1 to 8 carbon atoms, or cyclic saturated alkyl of from 1 to 10 carbon atoms. Examples of useful fluorinated monomers represented by formula $R^aCF{=}CR^a{}_2$ include vinylidene fluoride (VDF), tetrafluoroethylene (TFE), hexafluoropropylene (HFP), trifluoroethylene, chlorotrifluoroethylene, 2-chloropentafluoropropene, dichlorodifluoroethylene, 1,1-dichlorofluoroethylene, 1-hydropentafluoropropylene, 2-hydropentafluoropropylene, perfluoroalkyl perfluorovinyl ethers, and mixtures thereof.

In some embodiments, an amorphous fluoropolymer useful for practicing the present disclosure includes units from one or more monomers independently represented by formula $CF_2{=}CFORf$, wherein Rf is perfluoroalkyl having from 1 to 8, 1 to 4, or 1 to 3 carbon atoms, optionally interrupted by one or more —O— groups. Perfluoroalkoxyalkyl vinyl ethers suitable for making an amorphous fluoropolymer include those represented by formula $CF_2{=}CF(OC_nF_{2n})_zORf_2$, in which each n is independently from 1 to 6, z is 1 or 2, and $Rf_2$ is a linear or branched perfluoroalkyl group having from 1 to 8 carbon atoms and optionally interrupted by one or more —O— groups. In some embodiments, n is from 1 to 4, or from 1 to 3, or from 2 to 3, or from 2 to 4. In some embodiments, n is 1 or 3. In some embodiments, n is 3. $C_nF_{2n}$ may be linear or branched. In some embodiments, $C_nF_{2n}$ can be written as $(CF_2)_n$, which refers to a linear perfluoroalkylene group. In some embodiments, $C_nF_{2n}$ is —$CF_2$—$CF_2$—$CF_2$—. In some embodiments, $C_nF_{2n}$ is branched, for example, —$CF_2$—$CF(CF_3)$—. In some embodiments, $(OC_nF_{2n})_z$ is represented by —O—$(CF_2)_{1-4}$—[O$(CF_2)_{1-4}]_{0-1}$. In some embodiments, $Rf_2$ is a linear or branched perfluoroalkyl group having from 1 to 8 (or 1 to 6) carbon atoms that is optionally interrupted by up to 4, 3, or 2 —O— groups. In some embodiments, $Rf_2$ is a perfluoroalkyl group having from 1 to 4 carbon atoms optionally interrupted by one —O— group. Suitable monomers represented by formula $CF_2{=}CFORf$ and $CF_2{=}CF(OC_nF_{2n})_zORf_2$ include perfluoromethyl vinyl ether, perfluoroethyl vinyl ether, perfluoropropyl vinyl ether, $CF_2{=}CFOCF_2OCF_3$, $CF_2{=}CFOCF_2OCF_2CF_3$, $CF_2{=}CFOCF_2CF_2OCF_3$, $CF_2{=}CFOCF_2CF_2OCF_3$, $CF_2{=}CFOCF_2CF_2CF_2OCF_3$, $CF_2{=}CFOCF_2CF_2OCF_2CF_3$, $CF_2{=}CFOCF_2CF_2CF_2OCF_2CF_3$, $CF_2{=}CFOCF_2CF_2CF_2CF_2OCF_2CF_3$, $CF_2{=}CFOCF_2CF_2OCF_2OCF_3$, $CF_2{=}CFOCF_2CF_2OCF_2CF_2OCF_3$, $CF_2{=}CFOCF_2CF_2OCF_2CF_2CF_2OCF_3$, $CF_2{=}CFOCF_2CF_2OCF_2CF_2CF_2CF_2OCF_3$, $CF_2{=}CFOCF_2CF_2(OCF_2)_3OCF_3$, $CF_2{=}CFOCF_2CF_2(OCF_2)_4OCF_3$, $CF_2{=}CFOCF_2CF_2OCF_2OCF_2OCF_3$, $CF_2{=}CFOCF_2CF_2OCF_2CF_3$, $CF_2{=}CFOCF_2CF_2OCF_2CF_2OCF_2CF_3$, $CF_2{=}CFOCF_2CF(CF_3)$—O—$C_3F_7$ (PPVE-2), $CF_2{=}CF(OCF_2CF(CF_3))_2$—O—$C_3F_7$ (PPVE-3), and $CF_2{=}CF(OCF_2CF(CF_3))_3$—O—$C_3F_7$ (PPVE-4). Many of these perfluoroalkoxyalkyl vinyl ethers can be prepared according to the methods described in U.S. Pat. No. 6,255,536 (Worm et al.) and U.S. Pat. No. 6,294,627 (Worm et al.).

Perfluoroalkyl alkene ethers and perfluoroalkoxyalkyl alkene ethers may also be useful for making an amorphous polymer for the composition, method, and use according to the present disclosure. In addition, the amorphous fluoropolymers may include interpolymerized units of fluoro (alkene ether) monomers, including those described in U.S. Pat. No. 5,891,965 (Worm et al.) and U.S. Pat. No. 6,255,535 (Schulz et al.). Such monomers include those represented by formula $CF_2{=}CF(CF_2)_m$—O—$R_f$, wherein m is an integer from 1 to 4, and wherein $R_f$ is a linear or branched perfluoroalkylene group that may include oxygen atoms thereby forming additional ether linkages, and wherein $R_f$ contains from 1 to 20, in some embodiments from 1 to 10, carbon atoms in the backbone, and wherein $R_f$ also may contain additional terminal unsaturation sites. In some embodiments, m is 1. Examples of suitable fluoro (alkene ether) monomers include perfluoroalkoxyalkyl allyl ethers such as $CF_2{=}CFCF_2$—O—$CF_3$, $CF_2{=}CFCF_2$—O—$CF_2$—O—$CF_3$, $CF_2{=}CFCF_2$—O—$CF_2CF_2$—O—$CF_3$, $CF_2{=}CFCF_2$—O—$CF_2CF_2$—O—$CF_2$—O—$CF_2CF_3$, $CF_2{=}CFCF_2$—O—$CF_2CF_2$—O—$CF_2CF_2CF_2$—O—$CF_3$, $CF_2{=}CFCF_2$—O—$CF_2CF_2$—O—$CF_2CF_2$—O—$CF_2$—O—$CF_3$, $CF_2{=}CFCF_2CF_2$—O—$CF_2CF_2CF_3$. Suitable perfluoroalkoxyalkyl allyl ethers include those represented by formula $CF_2{=}CFCF_2(OC_nF_{2n})_zORf_2$, in which n, z, and $Rf_2$ are as defined above in any of the embodiments of perfluoroalkoxyalkyl vinyl ethers. Examples of suitable perfluoroalkoxyalkyl allyl ethers include $CF_2{=}CFCF_2OCF_2CF_2OCF_3$, $CF_2{=}CFCF_2OCF_2CF_2CF_2OCF_3$, $CF_2{=}CFCF_2OCF_2OCF_3$, $CF_2{=}CFCF_2OCF_2OCF_2CF_3$, $CF_2{=}CFCF_2OCF_2CF_2CF_2OCF_3$, $CF_2{=}CFCF_2OCF_2CF_2OCF_2CF_3$, $CF_2{=}CFCF_2OCF_2CF_2CF_2OCF_2CF_3$, $CF_2{=}CFCF_2OCF_2CF_2CF_2CF_2OCF_2CF_3$, $CF_2{=}CFCF_2OCF_2CF_2OCF_2OCF_3$, $CF_2{=}CFCF_2OCF_2CF_2OCF_2CF_2OCF_3$, $CF_2{=}CFCF_2OCF_2CF_2OCF_2CF_2CF_2OCF_3$, $CF_2{=}CFCF_2OCF_2CF_2OCF_2CF_2CF_2CF_2OCF_3$, $CF_2{=}CFCF_2OCF_2CF_2OCF_2CF_2CF_2CF_2CF_2OCF_3$, $CF_2{=}CFCF_2OCF_2CF_2(OCF_2)_3OCF_3$, $CF_2{=}CFCF_2OCF_2CF_2(OCF_2)_4OCF_3$, $CF_2{=}CFCF_2OCF_2CF_2OCF_2OCF_2OCF_3$, $CF_2{=}CFCF_2OCF_2CF_2OCF_2CF_3$, $CF_2$=$CFCF_2OCF_2CF_2OCF_2CF_2OCF_2CF_2CF_3$, $CF_2$=$CFCF_2OCF_2CF(CF_3)$—O—$C_3F_7$, and $CF_2$=$CFCF_2(OCF_2CF(CF_3))_2$—O—$C_3F_7$. Many of these perfluoroalkoxyalkyl allyl ethers can be prepared, for example, according to the methods described in U.S. Pat. No. 4,349,650 (Krespan).

An amorphous fluoropolymer useful for practicing the present disclosure may also comprise interpolymerized units derived from the interpolymerization of at least one monomer $R^aCF$=$CR^a{}_2$ with at least one non-fluorinated, copolymerizable comonomer represented by formula $R^b{}_2C$=$CR^b{}_2$, wherein each $R^b$ is independently hydrogen, chloro, alkyl having from 1 to 8, 1 to 4, or 1 to 3 carbon atoms, a cyclic saturated alkyl group having from 1 to 10, 1 to 8, or 1 to 4 carbon atoms, or an aryl group of from 1 to 8 carbon atoms. Examples of useful monomers represented by formula $R^b{}_2C$=$CR^b{}_2$ include ethylene and propylene. Perfluoro-1,3-dioxoles may also be useful to prepare the amorphous fluoropolymer. Perfluoro-1,3-dioxole monomers and their copolymers are described in U.S. Pat. No. 4,558,141 (Squires).

Examples of useful amorphous copolymers of fluorinated olefins are those derived, for example, from vinylidene fluoride and one or more additional olefins, which may or may not be fluorinated (e.g., represented by formula $R^aCF$=$CR^a{}_2$ or $R^b{}_2C$=$CR^b{}_2$). In some embodiments, useful fluoropolymers include copolymers of vinylidene fluoride with at least one terminally unsaturated fluoromonoolefin represented by formula $R^aCF$=$CR^a{}_2$ containing at least one fluorine atom on each double-bonded carbon atom. Examples of comonomers that can be useful with vinylidene fluoride include hexafluoropropylene, chlorotrifluoroethylene, 1-hydropentafluoropropylene, and 2-hydropentafluoropropylene. Other examples of amorphous fluoropolymers useful for practicing the present disclosure include copolymers of vinylidene fluoride, tetrafluoroethylene, and hexafluoropropylene or 1- or 2-hydropentafluoropropylene and copolymers of tetrafluoroethylene, propylene, and, optionally, vinylidene fluoride. In some embodiments, the amorphous fluoropolymer is a copolymer of hexafluoropropylene and vinylidene fluoride. Such fluoropolymers are described in U.S. Pat. No. 3,051,677 (Rexford) and U.S. Pat. No. 3,318,854 (Honn, et al.) for example. In some embodiments, the amorphous fluoropolymer is a copolymer of perfluoropropylene, vinylidene fluoride and tetrafluoroethylene. Such fluoropolymers are described in U.S. Pat. No. 2,968,649 (Pailthorp et al.), for example.

Amorphous fluoropolymers including interpolymerized units of VDF and HFP typically have from 30 to 90 percent by weight VDF units and 70 to 10 percent by weight HFP units. Amorphous fluoropolymers including interpolymerized units of TFE and propylene typically have from about 50 to 80 percent by weight TFE units and from 50 to 20 percent by weight propylene units. Amorphous fluoropolymers including interpolymerized units of TFE, VDF, and propylene typically have from about 45 to 80 percent by weight TFE units, 5 to 40 percent by weight VDF units, and from 10 to 25 percent by weight propylene units. Those skilled in the art are capable of selecting specific interpolymerized units at appropriate amounts to form an amorphous fluoropolymer. In some embodiments, polymerized units derived from non-fluorinated olefin monomers are present in the amorphous fluoropolymer at up to 25 mole percent of the fluoropolymer, in some embodiments up to 10 mole percent or up to 3 mole percent. In some embodiments, polymerized units derived from at least one of perfluoroalkyl vinyl ether or perfluoroalkoxyalkyl vinyl ether monomers are present in the amorphous fluoropolymer at up to 50 mole percent of the fluoropolymer, in some embodiments up to 30 mole percent or up to 10 mole percent.

In some embodiments, an amorphous fluoropolymer useful for practicing the present disclosure is a TFE/propylene copolymer, a TFE/propylene/VDF copolymer, a VDF/HFP copolymer, a TFE/VDF/HFP copolymer, a TFE/perfluoromethyl vinyl ether (PMVE) copolymer, a TFE/$CF_2$=$CFOC_3F_7$ copolymer, a TFE/$CF_2$=$CFOCF_3$/$CF_2$=$CFOC_3F_7$ copolymer, a TFE/$CF_2$=$C(OC_2F_5)_2$ copolymer, a TFE/ethyl vinyl ether (EVE) copolymer, a TFE/butyl vinyl ether (BVE) copolymer, a TFE/EVE/BVE copolymer, a VDF/$CF_2$=$CFOC_3F_7$ copolymer, an ethylene/HFP copolymer, a TFE/HFP copolymer, a CTFE/VDF copolymer, a TFE/VDF copolymer, a TFE/VDF/PMVE/ethylene copolymer, or a TFE/VDF/$CF_2$=$CFO(CF_2)_3OCF_3$ copolymer.

Some amorphous fluoropolymers described above in any of their embodiments are available from commercial sources. For example, copolymers of hexafluoropropylene and vinylidene fluoride are commercially available from 3M Company, St. Paul, Minn., under the trade designations as "3M DYNAMAR FX 9613" and "3M DYNAMAR FX 9614". Other useful fluoropolymers are commercially available from E.I. duPont de Nemours and Co., Wilmington, Del., under the trade designations "VITON A" and "VITON FREEFLOW" in various grades and from Daikin Industries, Ltd., Osaka, Japan, under the trade designation "DAI-EL" in various grades.

While the thermoplastic fluoropolymer disclosed herein can be used in combination with another polymer processing additive, the examples below show that the thermoplastic fluoropolymer is effective as a polymer processing additive in the absence of any other polymer processing additive. Accordingly, the compositions according to the present disclosure can be essentially free of other, different fluoropolymers (that is, not have the claimed amounts of vinylidene fluoride units, tetrafluoroethylene units, and hexafluoropropylene units). "Essentially free of other, different fluoropolymers" can refer to compositions including other fluoropolymers but in an amount that may be ineffective for improving the melt fracture performance during an extrusion when the polymer processing additive composition is included in a host resin. In some embodiments, the polymer processing additive composition may include up to or less than 1, 0.5, 0.25, or 0.1 percent by weight of other, different fluoropolymers. Being "essentially free of other, different fluoropolymers" can include being free of a second, different fluoropolymer. In any of these embodiments, the other, different fluoropolymer may be an amorphous fluoropolymer.

Thermoplastic fluoropolymers useful for practicing the present disclosure, which may include a polymer processing additive synergist, may be used in the form of powders, pellets, granules of the desired particulate size or size distribution, or in any other extrudable form. These compositions, useful as polymer processing additive compositions, can contain conventional adjuvants such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica).

HALS are typically compounds that can scavenge free-radicals, which can result from oxidative degradation. Some suitable HALS include a tetramethylpiperidine group, in which the nitrogen atoms on the piperidine may be unsubstituted or substituted by alkyl or acyl. Examples of suitable HALS include decanedioic acid, bis (2,2,6,6-tetramethyl-1-(octyloxy)-4-piperidinyl)ester, bis(2,2,6,6-tetramethyl-4-piperidyl)sebacate, 8-acetyl-3-dodecyl-7,7,9,9-tetramethyl-1,3,8-triazaspiro(4,5)-decane-2,5-dione, bis(2,2,6,6-tetramethyl-4-hydroxypiperidine succinate), and bis(N-methyl-2,2,6,6-tetramethyl-4-piperidyl)secacate. Suitable HALS further include those available, for example, from BASF, Florham Park, N.J., under the trade designations "CHIMASSORB". Examples of antioxidants include those obtained under the trade designations "IRGAFOS 168", "IRGANOX 1010" and "ULTRANOX 626", also available from BASF. These stabilizers including either of HALS, antioxidant, or both, if present, can be included in the compositions according to the present disclosure in any effective amount, typically up to 5, 2, to 1 percent by weight based on the total weight of the composition and typically at least 0.1, 0.2, or 0.3 percent by weight.

In some embodiments, compositions according to the present disclosure include a non-fluorinated host polymer. Generally, the non-fluorinated polymer is a thermoplastic, melt-processable polymer. The term "non-fluorinated" can refer to polymers having a ratio of fluorine atoms to carbon atoms of less than 1:2, in some embodiments, less than 1:3, 1:5, 1:10, 1:25, or 1:100. A non-fluorinated, thermoplastic polymer may also have no fluorine atoms. A wide variety of thermoplastic polymers are useful. Examples of useful thermoplastic polymers include non-fluorinated polymers such as hydrocarbon resins, polyamides (e.g., nylon 6, nylon 6/6, nylon 6/10, nylon 11 and nylon 12), polyester (e.g., poly (ethylene terephthalate), poly(butylene terephthalate)), and poly(lactic acid), chlorinated polyethylene, polyvinyl resins (e.g., polyvinylchoride, polyacrylates and polymethylacrylates), polycarbonates, polyketones, polyureas, polyimides, polyurethanes, polyolefins and polystyrenes. In some embodiments, the composition according to the present disclosure and/or useful in the method disclosed herein includes at least one of a polyolefin or a polyamide.

Useful melt-processable polymers have melt flow indexes (measured according to ASTM D1238 at 190° C., using a 2160-gram weight) of 5.0 grams per 10 minutes or less, or 2.0 grams per 10 minutes or less. Generally the melt flow indexes of melt-processable polymers are at least 0.1 or 0.2 grams per 10 minutes.

In some embodiments of the compositions and methods according to the present disclosure, useful thermoplastic polymers are hydrocarbon polymers, for example, polyolefins. Examples of useful polyolefins include those having the general structure $CH_2=CHR^3$, wherein $R^3$ is a hydrogen or alkyl. In some embodiments, the alkyl radical includes up to 10 carbon atoms or from one to six carbon atoms. Melt-processable polyolefins include polyethylene, polypropylene, poly(1-butene), poly(3-methylbutene), poly(4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 $g/cm^3$), high-density polyethylenes (e.g., those having a density of e.g. from 0.94 to about 0.98 $g/cm^3$), and polyethylene and olefin copolymers containing copolymerizable monomers (e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers). Melt-processable polymers include the metallic salts of the olefin copolymers, or blends thereof, which contain free carboxylic acid groups (e.g., polymers that include copolymerized acrylic acid). Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

The polyolefins useful for practicing the present disclosure may be obtained by the homopolymerization or copolymerization of olefins. Useful polyolefins may be copolymers of one or more olefins and up to about 30 weight percent or more, in some embodiments, 20 weight percent or less, of one or more monomers that are copolymerizable with such olefins.

Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

In some embodiments, a polyolefin useful in the compositions and methods disclosed herein is prepared by Ziegler-Natta catalysis. In some embodiments, a polyolefin useful in the compositions and methods disclosed herein is prepared by homogeneous catalysis. In some embodiments, homogeneous catalysis refers to catalysis in which the catalyst and the substrate are in the same phase (e.g., in solution). In some embodiments, homogeneous catalysis refers to catalysis carried out by catalysts having a single active site. Single site catalysts typically contain a single metal center.

In some embodiments, the homogeneously catalyzed polyolefin is a metallocene-catalyzed polyolefin. Metallocene catalysts typically have one or two cyclopentadienyl anions complexed to a positively charged metal such as zirconium, titanium, or hafnium. It is understood that the cyclopentadienyl groups can be substituted (e.g., by an alkyl, phenyl, or silyl group) or fused to an aromatic ring such as benzene, and two cyclopentadienyl groups or one cyclopentadienyl group and another coordinating group (e.g., N-alkyl, P-alkyl, O, or S) can be connected together through a bridging group (e.g., $(CH_3)_2Si$, $(CH_3)_2C$, or $CH_2CH_2$). The metal can include other ligands such as halogen, hydrogen, alkyl, phenyl, or an additional cyclopentadienyl group. Metallocene catalysts are typically used in combination with methyl alumoxane or borates under homogeneous reaction conditions.

Commercially available metallocene-catalyzed polyolefins include those from Exxon Chemical Company, Baytown, Tex., under the trade designations "EXXPOL", "EXACT", "EXCEED", and "VISTAMAXX", and from Dow Chemical Company, Midland, Mich., under the trade designations "AFFINITY" and "ENGAGE".

Homogeneous or single-site catalysts other than metallocene catalysts are also useful for providing homogeneously catalyzed polyolefins. Such catalysts typically include at least one first ligand strongly bonded to a metal (e.g., zirconium, titanium, hafnium, palladium, or nickel) and at least one other ligand that may be labile. The first ligands typically remain bonded to the metal after activation (e.g., by methyl alumoxane or borate), stabilize the single form of the catalyst, do not interfere with polymerization, provide shape to the active site, and electronically modify the metal. Some useful first ligands include bulky, bidentate diimine ligands, salicylimine ligands, tridentate pyridine diimine ligands, hexamethyldisilazane, bulky phenolics, and acetylacetonate. Many of these ligands are described, for example, in Ittel et al., Chem. Rev., 2000, 100, 1169-1203. Other single site catalysts such as those described by Nova Chemicals Corporation, Calgary, Canada, under the trade designation "ADVANCED SCLAIRTECH TECHNOLOGY".

Homogeneously catalyzed polyolefins may have higher molecular weights, lower polydispersity, fewer extractables, and different stereochemistry than polyolefins made by other methods such as Ziegler-Natta catalysis. Homogeneous catalysis also allows for a broader selection of polymerizable monomers than Ziegler-Natta catalysis. Ziegler-Natta catalysis, which employs halogenated transition metal complexes mixed with organometallic compounds, can leave acidic residues in the resultant polyolefin resin. Acid-neutralizing additives such as calcium stearate and zinc stearate have been added to such resins. For homogeneously catalyzed polyolefins, such acidic residues are generally not present; therefore acid-neutralizing additives may not be required.

Examples of useful homogeneously catalyzed polyolefins include those having the general structure $CH_2=CHR^3$, wherein $R^3$ is a hydrogen or alkyl. In some embodiments, alkyl includes up to 10 carbon atoms or from one to six carbon atoms. Homogeneously catalyzed polyolefins can include polyethylene, polypropylene, poly(1-butene), poly (3-methylbutene), poly(4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 $g/cm^3$), and high-density polyethylenes (e.g., those having a density of e.g. from 0.94 to about 0.98 $g/cm^3$). In some embodiments, the homogeneously catalyzed polyolefin is linear low density polyethylene. In any of these embodiments, the homogeneously catalyzed polyolefin may be a metallocene-catalyzed polyolefin.

Compositions including non-fluorinated, thermoplastic polymers useful for practicing any of the embodiments of the present disclosure can contain any of the conventional adjuvants described above in any of their embodiments such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica).

The non-fluorinated, thermoplastic polymers may be used in the form of powders, pellets, granules, or in any other extrudable form. Compositions according to the present disclosure can be prepared by any of a variety of ways. For example, the thermoplastic fluoropolymer can be mixed with the non-fluorinated, thermoplastic polymers during the extrusion into polymer articles. Compositions according to the present disclosure can also include so-called masterbatches, which may contain the thermoplastic fluoropolymer or a blend thereof, further components (e.g., synergist or adjuvants described above), and/or one or more host thermoplastic polymers. A masterbatch can be a useful, diluted form of a polymer processing additive. Masterbatches can contain the thermoplastic fluoropolymer, and optionally a synergist, dispersed in or blended with a host polymer, which can be a polyolefin, homogeneously catalyzed polyolefin, metallocene-catalyzed polyolefin, a polyamide, or any of the non-fluorinated thermoplastics described above. Preparation of a masterbatch may allow for more accurate amounts of a polymer processing additive to be added to an extrudable composition, for example. The masterbatch may be a composition ready to be added to a thermoplastic polymer for being extruded into a polymer article. Masterbatches, which include concentrations of polymer processing additives as described below, are often prepared at relatively high temperatures under aerobic conditions. In some embodiments in which the masterbatch includes a poly(oxyalkylene) polymer synergist, a metal salt of a carboxylic acid, sulfonic acid, or alkylsulfate as described above in any of its embodiments may be useful as a stabilizer.

The masterbatches can also be prepared by blending the thermoplastic fluoropolymer with other additives to be used in the formulation and optionally polyethylene resin, and forming them into a compressed pellet using a method according to or similar to the one described in U.S. Pat. No. 8,501,862 (Bonnet et al.).

The non-fluorinated, thermoplastic polymer (in some embodiments, polyolefin) to be extruded and the polymer processing additive composition can be combined together by any of the blending means usually employed in the plastics industry, such as with a compounding mill, a Banbury mixer, or a mixing extruder in which the polymer processing additive composition is uniformly distributed throughout the host thermoplastic polymer. The mixing operation is most conveniently carried out at a temperature above the softening point of fluoropolymer and/or the synergist although it is also possible to dry-blend the components as particulates and then cause uniform distribution of the components by feeding the dry blend to a twin-screw melt extruder.

The resulting mixture can be pelletized or otherwise comminuted into a desired particulate size or size distribution and fed to an extruder, which typically will be a single-screw extruder, that melt-processes the blended mixture. Melt-processing typically is performed at a temperature from 180° C. to 280° C., although optimum operating temperatures are selected depending upon the melting point, melt viscosity, and thermal stability of the blend. Different types of extruders that may be used to extrude the compositions disclosed herein are described, for example, by Rauwendaal, C., "Polymer Extrusion", Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.).

Such compositions may be mixed with further non-fluorinated, thermoplastic polymer and/or further components to obtain a composition ready for processing into a polymer article. The composition may also contain all required ingredients and are ready for being extruded into a polymer article. The amount of thermoplastic fluoropolymer in these compositions is typically relatively low. Accordingly, the non-fluorinated, thermoplastic polymer is present in a major amount in the some embodiments of the composition according to the present disclosure. A major amount would be understood to be greater than 50 percent by weight of the composition. In some embodiments, the major amount is at least 60, 70, 75, 80, or 85 percent by weight of the composition. The exact amount used may be varied depending upon whether the extrudable composition is to be extruded into its final form (e. g., a film) or whether it is to be used as a masterbatch or processing additive which is to be (further) diluted with additional host polymer before being extruded into its final form.

Generally, the composition according to the present disclosure that contains a non-fluorinated, thermoplastic polymer, which in some embodiments is a polyolefin (e.g., homogeneously catalyzed or metallocene-catalyzed polyolefin) or polyamide composition, includes the thermoplastic fluoropolymer disclosed herein in a range from about 0.002 to 50 weight percent (in some embodiments, 0.002 to 10 weight percent), based on the total weight of the composition. In some of these embodiments, the combined weight of the thermoplastic fluoropolymer and the polymer processing additive synergist is in a range from 0.01 percent to 50 percent (in some embodiments, 0.002 to 10 weight percent), based on the total weight of the composition. In a masterbatch composition, the combined weight of the thermoplastic fluoropolymer and any polymer processing additive synergist can be in a range from 1 percent to 50 percent, in some embodiments, 1 percent to 10 percent, 1 percent to 5 percent, 2 percent to 10 percent, or 2 percent to 5 percent, based on the total weight of the composition. If the composition is to be extruded into final form and is not further diluted by the addition of host polymer, it typically contains a lower concentration of thermoplastic fluoropolymer. In some of these embodiments, the combined weight of the thermoplastic fluoropolymer and any polymer processing additive synergist is in a range from about 0.002 to 2 weight percent, in some embodiments about 0.01 to 1 weight percent, or 0.01 to 0.2 weight percent, based on the total weight of the composition. The upper concentration of polymer processing additive used is generally determined by economic limitations rather than by any adverse physical effect of the concentration of the polymer processing additive.

The compositions according to the present disclosure may be extruded or processed in a variety of ways, which includes for example, extrusion of films, extrusion blow molding, injection molding, pipe, wire and cable extrusion, and fiber production.

The examples, below, demonstrate that fluorinated thermoplastic polymers described herein offer comparable melt fracture clearance performance to state-of-the-art amorphous vinylidene fluoride-hexafluoropropylene copolymers with similar melt viscosities. For example, the time to clear melt fracture in Examples 2 and 3 approached the time to clear melt fracture in Comparative Example 3, containing "3M DYNAMAR FX 9614", which has a similar melt viscosity to VDF-TFE copolymers in Preparative Examples 2 and 3. Also, the time to clear melt fracture in Examples 1 and 11 was lower than the time to clear melt fracture in Comparative Example 1, containing "3M DYNAMAR FX 9613", which has a similar melt viscosity to VDF-TFE copolymers in Preparative Example 1 and "KYNAR 7201".

Also, as shown in the Examples, below, the melt fracture clearance performance of the thermoplastic fluoropolymers having at least 30 mole percent vinylidene fluoride units, at least 5 mole percent tetrafluoroethylene units, and less than 5 mole percent hexafluoropropylene units is typically significantly better than that of other ammonia-resistant thermoplastics. For example, Comparative Example 5 is ammonia resistant as shown in Table 7 but did not clear melt fracture in 120 minutes as shown in Table 10. In contrast, thermoplastic fluoropolymers having at least 30 mole percent vinylidene fluoride units, at least 5 mole percent tetrafluoroethylene units, and less than 5 mole percent hexafluoropropylene units were also ammonia resistant as shown in Table 7 and typically provided a significant decrease in melt fracture within 120 minutes as shown in Table 10. Thus, we have found that the thermoplastic fluoropolymers having at least 30 mole percent vinylidene fluoride units, at least 5 mole percent tetrafluoroethylene units, and less than 5 mole percent hexafluoropropylene units can provide a combination of desirable melt fracture clearance performance and good chemical stability.

SOME EMBODIMENTS OF THE DISCLOSURE

In a first embodiment, the present disclosure provides a composition comprising:

a thermoplastic fluoropolymer comprising vinylidene fluoride units in an amount of at least 30 mole percent and tetrafluoroethylene units in an amount of at least 5 mole percent, wherein the thermoplastic fluoropolymer is free of hexafluoropropylene units or comprises less than 5 mole percent hexafluoropropylene units; and at least one of a non-fluorinated, thermoplastic polymer as a major component of the composition or a polymer processing additive synergist.

In a second embodiment, the present disclosure provides the composition of the first embodiment, wherein the composition comprises the non-fluorinated, thermoplastic polymer.

In a third embodiment, the present disclosure provides the composition of the second embodiment, wherein the thermoplastic fluoropolymer is present in an amount from 0.002 percent to 50 percent or 10 percent, based on the total weight of the composition.

In a fourth embodiment, the present disclosure provides the composition of any one of the first to third embodiments, wherein the composition comprises the polymer processing additive synergist, and wherein the polymer processing additive synergist is a poly(oxyalkylene) polymer, a silicone-polyether copolymer, an aliphatic polyester, an aromatic polyester, a polyether polyol, or a combination thereof.

In a fifth embodiment, the present disclosure provides the composition of the fourth embodiment, wherein the polymer processing additive synergist comprises at least one of a poly(oxyalkylene) polymer or a polycaprolactone.

In a sixth embodiment, the present disclosure provides the composition of the fifth embodiment, wherein the polymer processing additive synergist comprises the poly(oxyalkylene) polymer and further comprises a metal salt of a carboxylic acid, sulfonic acid, or alkylsulfate.

In a seventh embodiment, the present disclosure provides the composition of any one of the first to sixth embodiments, further comprising at least one of a silicone-polyether copolymer, a silicone-polycaprolactone copolymer, a polysiloxane, a polydiorganosiloxane polyamide copolymer, a polydiorganosiloxane polyoxamide copolymer, or a silicone-polyurethane copolymer.

In an eighth embodiment, the present disclosure provides the composition of any one of the first to seventh embodiments, wherein the thermoplastic fluoropolymer has a multimodal molecular weight distribution.

In a ninth embodiment, the present disclosure provides the composition of the fifth embodiment, wherein the polymer processing additive synergist comprises the poly(oxyalkylene) polymer and wherein the composition is lighter in color after exposure to vapors from a 28% ammonia solution for 18 hours than a comparable composition that is the same as the composition but includes a vinylidene fluoride and hexafluoropropylene copolymer instead of the thermoplastic fluoropolymer.

In a tenth embodiment, the present disclosure provides the composition of any one of the first to ninth embodiments, further comprising an amorphous fluoropolymer.

In an eleventh embodiment, the present disclosure provides the composition of any one of the first to tenth embodiments, wherein the thermoplastic fluoropolymer has long-chain branching.

In a twelfth embodiment, the present disclosure provides a method of reducing melt defects during the extrusion of a non-fluorinated, thermoplastic polymer, the method comprising:

combining a non-fluorinated, thermoplastic polymer and a thermoplastic fluoropolymer to provide an extrudable composition, the thermoplastic fluoropolymer comprising vinylidene fluoride units in an amount of at least 30 mole percent and tetrafluoroethylene units in an amount of at least 5 mole percent, wherein the thermoplastic fluoropolymer is free of hexafluoropropylene units or comprises less than 5 mole percent hexafluoropropylene units; and extruding the extrudable composition.

In a thirteenth embodiment, the present disclosure provides the method of the eleventh embodiment, wherein the thermoplastic fluoropolymer is present in an amount from 0.002 percent to 50 percent or 10 percent, based on the total weight of the extrudable composition.

In a fourteenth embodiment, the present disclosure provides the method of the twelfth or thirteenth embodiment, further comprising combining a polymer processing additive synergist with the non-fluorinated, thermoplastic polymer and the thermoplastic fluoropolymer to make the extrudable composition.

In a fifteenth embodiment, the present disclosure provides the method of the fourteenth embodiment, wherein the polymer processing additive synergist is a poly(oxyalkylene) polymer, a silicone-polyether copolymer, an aliphatic polyester, an aromatic polyester, a polyether polyol, or a combination thereof.

In a sixteenth embodiment, the present disclosure provides the method of the fifteenth embodiment, wherein the polymer processing additive synergist comprises at least one of a poly(oxyalkylene) polymer or a polycaprolactone.

In a seventeenth embodiment, the present disclosure provides the method of the sixteenth embodiment, wherein the polymer processing additive synergist comprises the poly(oxyalkylene) polymer and further comprises a metal salt of a carboxylic acid, sulfonic acid, or alkylsulfate.

In an eighteenth embodiment, the present disclosure provides the method of any one of the twelfth to seventeenth embodiments, further comprising combining at least one of a silicone-polyether copolymer, a silicone-polycaprolactone copolymer, a polysiloxane, a polydiorganosiloxane polyamide copolymer, a polydiorganosiloxane polyoxamide copolymer, or a silicone-polyurethane copolymer with the non-fluorinated, thermoplastic polymer and the thermoplastic fluoropolymer to make the extrudable composition.

In a nineteenth embodiment, the present disclosure provides the method of any one of the twelfth to eighteenth embodiments, wherein the thermoplastic fluoropolymer has a multimodal molecular weight distribution.

In a twentieth embodiment, the present disclosure provides the method of the sixteenth embodiment, wherein the polymer processing additive synergist comprises the poly(oxyalkylene) polymer and wherein the composition is lighter in color after exposure to vapors from a 28% ammonia solution for 18 hours than a comparable composition that is the same as the composition but includes a vinylidene fluoride and hexafluoropropylene copolymer instead of the thermoplastic fluoropolymer.

In a twenty-first embodiment, the present disclosure provides the method of any one of the twelfth to twentieth embodiments, further comprising combining an amorphous fluoropolymer with the non-fluorinated, thermoplastic polymer and the thermoplastic fluoropolymer to make the extrudable composition.

In a twenty-second embodiment, the present disclosure provides the method of any one of the twelfth to twenty-first embodiments, wherein the thermoplastic fluoropolymer has long-chain branching.

In a twenty-third embodiment, the present disclosure provides the composition or method of any one of the first to twenty-second embodiments, wherein the non-fluorinated, thermoplastic polymer comprises at least one of a polyolefin, polyamide, polyimide, polyurethane, polyester, polycarbonate, polyketone, polyurea, polystyrene, polyvinyl chloride, polyacrylate, or polymethacrylate.

In a twenty-fourth embodiment, the present disclosure provides the composition or method of the twenty-third embodiment, wherein the non-fluorinated, thermoplastic polymer is a polyolefin.

In a twenty-fifth embodiment, the present disclosure provides the composition or method of the twenty-fourth embodiment, wherein the polyolefin is a homogeneously catalyzed polyolefin.

In a twenty-sixth embodiment, the present disclosure provides the composition or method of the twenty-fourth or twenty-fifth embodiment, wherein the polyolefin is a metallocene-catalyzed polyolefin.

In a twenty-seventh embodiment, the present disclosure provides the composition or method of any one of the twenty-fourth to twenty-sixth embodiments, wherein the melting point of the thermoplastic fluoropolymer is up to 130° C.

In a twenty-eighth embodiment, the present disclosure provides the composition or method of the twenty-third embodiment, wherein the non-fluorinated, thermoplastic polymer is a polyamide.

In a twenty-ninth embodiment, the present disclosure provides the composition or method of the twenty-eighth embodiment, wherein the melting point of the thermoplastic fluoropolymer is at least 130° C.

In a thirtieth embodiment, the present disclosure provides a polymer processing additive composition comprising:

a thermoplastic fluoropolymer comprising vinylidene fluoride units in an amount of at least 30 mole percent and tetrafluoroethylene units in an amount of at least 5 mole percent, wherein the thermoplastic fluoropolymer is free of hexafluoropropylene units or comprises less than 5 mole percent hexafluoropropylene units; and a polymer processing additive synergist.

In a thirty-first embodiment, the present disclosure provides the polymer processing additive composition of the thirtieth embodiment, wherein the polymer processing additive synergist is a poly(oxyalkylene) polymer, a silicone-polyether copolymer, an aliphatic polyester, an aromatic polyester, a polyether polyol, or a combination thereof.

In a thirty-second embodiment, the present disclosure provides the polymer processing additive composition of the thirtieth or thirty-first embodiment, wherein the polymer processing additive synergist comprises at least one of a poly(oxyalkylene) polymer or a polycaprolactone.

In a thirty-third embodiment, the present disclosure provides the polymer processing additive composition of the thirty-second embodiment, wherein the polymer processing additive synergist comprises the poly(oxyalkylene) polymer and further comprises a metal salt of a carboxylic acid, sulfonic acid, or alkylsulfate.

In a thirty-fourth embodiment, the present disclosure provides the use of a thermoplastic fluoropolymer having vinylidene fluoride units in an amount of at least 30 mole percent and tetrafluoroethylene units in an amount of at least 5 mole percent as a polymer processing additive, wherein the thermoplastic fluoropolymer is free of hexafluoropropylene units or comprises less than 5 mole percent hexafluoropropylene units.

In a thirty-fifth embodiment, the present disclosure provides the composition, method, or use of any one of the first to the thirty-fourth embodiments, wherein the amount of the vinylidene fluoride units is in a range from 30 mole percent to 95 mole percent, and wherein the amount of the tetrafluoroethylene units is in a range from 5 mole percent to 70 mole percent.

In a thirty-sixth embodiment, the present disclosure provides the composition, method, or use of any one of the first to thirty-fifth embodiments, wherein the amount of the vinylidene fluoride units is in a range from 55 mole percent to 90 mole percent, and wherein the amount of the tetrafluoroethylene units is in a range from 10 mole percent to 45 mole percent.

In a thirty-seventh embodiment, the present disclosure provides the composition, method, or use of any one of the first to thirty-sixth embodiments, wherein the amount of the vinylidene fluoride units is in a range from 70 mole percent to 90 mole percent, and wherein the amount of the tetrafluoroethylene units is in a range from 10 mole percent to 30 mole percent.

In a thirty-eighth embodiment, the present disclosure provides the composition, method, or use of any one of the first to thirty-seventh embodiments, wherein the vinylidene fluoride units and the tetrafluoroethylene units are present in the thermoplastic fluoropolymer a combined amount of at least 95 mole percent, based on the total moles of the thermoplastic fluoropolymer.

In a thirty-ninth embodiment, the present disclosure provides the composition, method, or use of any one of the first to thirty-eighth embodiments, wherein the vinylidene fluoride units and the tetrafluoroethylene units are present in the thermoplastic fluoropolymer a combined amount of at least 99 mole percent, based on the total moles of the thermoplastic fluoropolymer.

In a fortieth embodiment, the present disclosure provides the composition, method, or use of any one of the first to the thirty-ninth embodiments, wherein the thermoplastic fluoropolymer further comprises units selected from chlorotrifluoroethylene units, 1-hydropentafluoropropylene units, 2-hydropentafluoropropylene units, and propylene units.

In a forty-first embodiment, the present disclosure provides the composition, method, or use of any one of the first to fortieth embodiments, wherein the thermoplastic fluoropolymer has long-chain branching.

In a forty-second embodiment, the present disclosure provides the composition, method, or use of any one of the first to forty-first embodiments, wherein the thermoplastic fluoropolymer has an acid value less than or equal to 1, 0.9, 0.8, 0.75, 0.6, or 0.5 milligrams KOH per gram.

In a forty-third embodiment, the present disclosure provides the composition, method, or use of any one of the first to forty-second embodiments, wherein the composition, polymer processing additive composition, or extrudable composition further comprises a thermoplastic fluoropolymer having an acid value of at least 1, 1.25, 1.5, or 1.75 milligrams KOH per gram.

In a forty-fourth embodiment, the present disclosure provides the composition, method, or use of any one of the first to forty-first embodiments, wherein the thermoplastic fluoropolymer has an acid value of at least 1, 1.25, 1.5, or 1.75 milligrams KOH per gram.

In a forty-fifth embodiment, the present disclosure provides the composition, method, or use of any one of the first to forty-fourth embodiments, wherein the thermoplastic fluoropolymer has a log [zero shear viscosity/1 Pascal·second (Pa·s)] at 190° C. in a range from 4 to 11 or from 5 to 10.

In a forty-sixth embodiment, the present disclosure provides the composition, method, or use of any one of the first to forty-fifth embodiments, wherein the composition, the polymer processing additive composition, or the extrudable composition further comprises a hindered amine light stabilizer.

In a forty-seventh embodiment, the present disclosure provides the composition or method of any one of the first to twenty-ninth embodiments, wherein the composition is a packaging material for an alkaline product.

In order that this disclosure can be more fully understood, the following examples are set forth. It should be understood that these examples are for illustrative purposes only and are not to be construed as limiting this disclosure in any manner.

EXAMPLES

All materials are commercially available, for example from Sigma-Aldrich Chemical Company; Milwaukee, Wis., or known to those skilled in the art unless otherwise stated or apparent.

The following abbreviations are used in this section: h=hours, min=minutes, s=seconds, mg=milligrams, g=grams, kg=kilograms, lb=pounds, L=liters, ppm=parts per million, N=normal, mm=millimeters, mil=thousandth of an inch, rad=radians, Pa=pascal, psig=pounds per square inch gage, η'=dynamic shear viscosity, η*=complex viscosity, τ=relaxation time, $m_1$=measurement of the curvature of the viscosity curve, inversely proportional to polydispersity, ΔHa=activation energy of flow in kJ/mol, J=joules, RPM=revolutions per minute.

TABLE 1

Materials Used in Examples

| Abbreviation | Description |
| --- | --- |
| FX-9613 | A copolymer of hexafluoropropylene and vinylidene fluoride polymer processing aid (PPA) commercially available under the trade designation "3M Dynamar Polymer Processing Additive FX 9613" from 3M Company, St. Paul, MN |

TABLE 1-continued

Materials Used in Examples

| Abbreviation | Description |
| --- | --- |
| FX-9614 | A copolymer of hexafluoropropylene and vinylidene fluoride PPA commercially available under the trade designation "3M Dynamar Polymer Processing Additive FX 9614" from 3M Company, St. Paul, MN |
| FX-5911 | A terpolymer of tetrafluoroethylene, hexafluoropropylene, and vinylidene fluoride PPA commercially available under the trade designation "3M Dynamar Polymer Processing Additive FX 5911" from 3M Company, St. Paul, MN |
| FX-5914 | A terpolymer of tetrafluoroethylene, hexafluoropropylene, and ethylene PPA commercially available under the trade designation "3M Dynamar Polymer Processing Additive FX 5914" from 3M Company, St. Paul, MN |
| Kynar 7201 | A tetrafluoroethylene/vinylidene fluoride fluoropolymer obtained from Atochem (now Arkema, Inc.) but no longer commercially available. |
| Kynar 5300 | A PPA comprising a copolymer of hexafluoropropylene and vinylidene fluoride and a polyethylene glycol commercially available under the trade designation "Kynar Flex ® 5300" from Arkema Inc., King of Prussia, PA. |
| LLDPE 2.0 | 2.0 MI Ziegler-Natta LLDPE available under the trade designation "EXXONMOBIL LLDPE LL 1002.09" from Exxon Mobil as a granular resin |
| LLDPE 0.9 | 0.9 MI Ziegler-Natta LLDPE available under the trade designation "MARFLEX 7109" from Chevron Phillips Chemical Co. LP, The Woodlands, TX |
| Antioxidant | Blend of "IRGAFOS 168" and "IRGANOX 1076" available from BASF under the trade designation "IRGANOX B 900" |
| Zn Stearate | Commercially available under the trade designation "Zinc Stearate 33238" from Alfa Aesar, Ward Hill, MA |
| $CF_3$—O—$CF_2CF_2CF_2$—O—$CHFCF_2$—$COONH_4$ | Prepared as described in U.S. Pat. No. 7,671,112, Hintzer, et al. |
| FC-70 | A fluid commercially available from 3M Company, St Paul, MN, under the trade designation "Fluorinert ™ FC-70." |
| APS | Ammonium persulfate, an initiator, commercially available from Peroxychem, Philadelphia, PA. |
| DEM | Diethyl malonate, a molecular weight regulator, commercially available from Aceto Corporation, New York, New York. |
| Ammonia | Ammonium hydroxide (28% in water), a base, commercially available from Aldrich Chemical, St. Louis, MO. |
| PEG | Polyethylene Glycol, commercially available under the trade designation "PEG 8000" from Dow Chemical, Midland, MI |
| Antiblock | Antiblock masterbatch, commercially available under the trade designation "Talc LDPE MB # 101558" from Ampacet, Tarrytown, NY |
| Slip Agent | 5% erucamide in polyethyelene concentrate, commercially available under the trade designation "MB # 10090" from Ampacet, Tarrytown, NY |

Fluoropolymer Preparation

Polymerization Method for Preparative Examples 1 Through 9 (PE-1 Through PE-9)

To prepare PE-1, to an autoclave was added 2.50 L of water, 33 g of a 30% solution of $CF_3$—O—$CF_2CF_2CF_2$—O—$CHFCF_2$—$COONH_4$ with 1.5 wt. % FC-70 added based on the weight of the $CF_3$—O—$CF_2CF_2CF_2$—O—$CHFCF_2$—$COONH_4$, 2 g of DEM and a further 350 g of water as a rinse. The reactor temperature was maintained at 71.1° C. (160° F.). After a series of three nitrogen purges and evacuations, the final vacuum was broken with a precharge of 106 g VDF precharge, followed by a precharge of 23 g TFE, to obtain a reaction pressure of $1.52 \times 10^6$ Pa (220 psig). The precharge monomer ratio was selected based on the reactivity ratio of the monomers in order to obtain the target monomer composition in the copolymer. Due to the limitations of equipment, there is variation between the in the selected target precharge amounts for both VDF and TFE and the actual amounts added. The actual amounts added are reported in Table 2, below. After the pressure of $1.52 \times 10^6$ Pa (220 psig) was reached, a solution containing 3 g of APS was injected into the kettle. As monomers were converted to polymer, monomers were fed to the reactor at a TFE:VDF feed ratio of 0.391, which corresponded to the selected monomer mol % ratio of 80:20 VDF/TFE. In this way, a constant pressure and composition was maintained until 500 g of VDF was added to the reactor. Despite an offset from the target monomer ratio in the precharges, overall polymer composition was expected to shift closer to the feed ratio composition during the polymerization. At the end of the polymerization, the remaining monomer was vented, the reactor was cooled, and the latex was recovered. Latex was coagulated through a freeze thaw cycle, rinsed with deionized water, and then dried overnight at 127° C. (260° F.).

PE-2 through PE-9 were prepared using the same procedure, with deviations in the amounts of VDF precharge, TFE precharge, APS, DEM, and VDF added during polymerizations, as well as the selected mol % of VDF and TFE, as indicated in Table 2, below. For PE-2, the reaction stopped after 660 g VDF were added due to coagulation in the reactor. For PE-7, a TFE:VDF feed ratio of 0.786 was used, and for PE-8, a TFE:VDF feed ratio of 0.111 was used.

TABLE 2

Fluoropolymer Preparation Conditions

| PE Number | VDF Precharge (g) | TFE Precharge (g) | APS (g) | DEM (g) | VDF (g) | Mol % VDF | Mol % TFE |
|---|---|---|---|---|---|---|---|
| PE-1 | 106 | 23 | 3.0 | 2.0 | 500 | 80 | 20 |
| PE-2 | 110 | 25 | 3.0 | 1.0 | 660 | 80 | 20 |
| PE-3 | 106 | 24 | 3.0 | 1.0 | 500 | 80 | 20 |
| PE-4 | 110 | 45 | 6.0 | 0 | 415 | 80 | 20 |
| PE-5 | 103 | 25 | 25.0 | 5.0 | 392 | 80 | 20 |
| PE-6 | 110 | 14 | 9.0 | 0 | 500 | 80 | 20 |
| PE-7 | 78 | 53 | 3.0 | 1.0 | 400 | 67 | 33 |
| PE-8 | 107 | 5 | 3.0 | 1.0 | 283 | 93 | 7 |

Commercially available materials were evaluated as polymer processing additives. Reported in Table 3 for PPA-10 through PPA-15 are trade designations of each of these commercially available materials.

TABLE 3

PPAs Evaluated

| PPA | Sample |
|---|---|
| PPA-10 | FX 9613 |
| PPA-11 | FX 9614 |
| PPA-12 | FX 5911 |
| PPA-13 | FX 5914 |
| PPA-14 | Kynar 7201 |
| PPA-15 | Kynar 5300 |

Fluoropolymer Characterization
Method for Measuring Acid Value

The acid value of selected fluoropolymers was measured by titrating the dissolved polymer using the following procedure. Each sample was weighed and then dissolved by stirring in a covered container for about 14 h in acetone (AR grade). A solvent blank was subtracted from all samples. Dissolved samples were titrated with an automatic titrator available under the trade designation "808" from Metrohm USA, Riverview, Fla., and an organic solvent tolerant pH electrode, available under the trade designation "Solvotrode," from Metrohm USA. The titrant was 0.1 N tetrabutylammonium hydroxide in methanol, standardized against potassium hydrogen phthalate. Replicates and relatively large size samples were titrated to ensure and verify homogeneity of the sample. Total acid value was reported based upon final titration volume for samples for samples having more than one endpoint. The mean and standard deviation of acid value results for triplicate measurements, reported in mg of KOH per gram of sample, abbreviated as "mg KOH/g", are provided in Table 4, below.

TABLE 4

Acid Value Measurement Results

| Fluoropolymer | Acid Value (mg KOH/g) |
|---|---|
| PE-1 | 0.59 ± 0.02 |
| PE-3 | 0.60 ± 0.04 |
| PE-5 | 1.82 ± 0.16 |

Method for Measuring Viscosity

The melt viscosity of PE-1 through PE-8 and PPA-14 was measured using a parallel plate rheometer available under the trade designation "AR2000ex" from TA instruments. It was fitted with Ni plated 25 mm disposable plates mounted on an electrically heated plates system (EHP). The samples were pressed into a bubble free 1.25 mm sheet at approximately 150° C. For each sample tested, a 30 mm diameter disc was cut out and placed between the rheometer plates at 150° C. The gap was set at 1.1 mm and the sample was trimmed after the normal force stabilized. The gap was then set to 1.0 mm and the measurement was initialized after the normal force stabilized.

The procedure was a time and frequency sweep, with five points per decade, at frequencies ranging from 0.1 to 398.1 rad/s, and at seven temperatures, 150° C., 170° C., 190° C., 210° C., 230° C., 250° C., and 270° C., and a strain of 10%. Six of the seven temperatures were selected to give the best fit, which were 150° C. to 250° C. for PE-1 to PE-6 and 170° C. to 270° C. for PE-7 and PE-8.

A Cole-Cole Plot and a Van Gurp-Palmen Plot were used to verify the data consistency. Any scatter in the dataset on those plots is indicative of improper test conditions, multiple phases/responses, or of changing structure during the test (long chain branching, crystallinity, degradation, foaming, etc.). Any grossly inconsistent data was rejected from the analysis.

The $\eta'$ and $\eta^*$ data was fitted simultaneously to the combined Carreau-Yasuda model and Arrhenius equation (Equations used in U.S. Pat. No. 5,710,217 (Blong et al.) to fit $\eta^*$ alone), using the Solver add-on in Microsoft Excel. For that purpose, $\eta_o$, $\tau$, $m_1$ and $\Delta H_a$ were kept the same for both $\eta'$ and $\eta^*$. The "n" value was adjusted for each curve. One of the fit parameters is the log [Zero Shear Viscosity (Pa·s)/1 Pa·s], shown as $\log(\eta_o)$ in Table 5. The log zero shear viscosity results at 190° C., which were obtained from the curve fitting procedure, are provided in Table 5 below.

Method for Measuring Thermal Properties

The melt temperature, crystallization temperature, heat of fusion ($\Delta Hm$) and heat of crystallization ($\Delta Hc$) of PE-1 through PE-8 and PPA-14 were measured according to ASTM D3418. The samples were prepared in Aluminum pans with samples weights of approximately 4 mg and tested using a TA instrument Q2000 DSC. The samples were subjected to a Heat/Cool/Heat cycle where the lower temperature was −80° C. and the upper temperature 250° C. The crystallization properties were reported on the cooling segment and the melting properties on the second heating segment. The melt temperature, crystallization temperature, heat of fusion ($\Delta Hm$) and heat of crystallization ($\Delta Hc$) results are presented in Table 5.

TABLE 5

Viscosity and Thermal Properties of PE-1 through PE-8 and PPA-14

| PPA | $\log(\eta_o)$ | Tm Peak (° C.) | $\Delta Hm$ (J/g) | Tc Onset (° C.) | $\Delta Hc$ (J/g) |
|---|---|---|---|---|---|
| PE-1 | 4.5 | 125.0 | 38.5 | 109.0 | 40.0 |
| PE-2 | 7.7 | 123.8 | 28.2 | 107.5 | 35.9 |
| PE-3 | 7.0 | 124.4 | 34.8 | 106.9 | 36.2 |
| PE-4 | 11.2 | 128.6 | 31.4 | 116.5 | 33.2 |
| PE-5 | ~1.4* | 123.9 | 40.3 | 107.5 | 41.9 |
| PE-6 | 8.1 | 125.6 | 33.9 | 110.1 | 34.9 |
| PE-7 | 5.4 | 154.1 | 30.7 | 138.8 | 40.7 |
| PE-8 | 7.0 | 153.8 | 37.0 | 126.9 | 43.1 |
| PPA-14 | 4.6 | 123.3 | 36.9 | 110.0 | 40.0 |

*= Value estimated

Master Batch (MB) Preparation

PE-1 through PE-8 and PPA-10 through PPA-15 were compounded into MBs at a level of 3%. Each MB was prepared in 1 kg batches by shaking vigorously in a bag 970 g of granular resin (2MI LLDPE, EM 1002.09 available from Exxon Mobil), 1.0 g of Irganox B900, 0.7 g of Zinc Stearate, and either 30 g of a PE or PPA listed in Table 2 or 15 g of a PE or PPA listed in Table 2 and 15 g of PEG. Each mixture was fed to a laboratory scale, intermeshing, counter rotating, unvented, air cooled, conical twin screw (Haake-Buchler Rheomix TW-100) with a front inside diameter of 20 mm. Each mixture was gravity fed to the throat of the extruder, exposed to air at a rate of 50 g/min. The extruder specific temperature profile of the 3 barrel zones (feed, metering, mixing), and die zone was 170/190/200/200° C. respectively. The extruder was run at 150 RPM for the first "compounding" pass. The second pass was run with the same temperature profile, but at 90 RPM, while flood feeding the material. A 4 min "purge" of material was discarded at the beginning of each pass. The MBs prepared with PEs listed in Table 2 and PPAs listed in Table 3 are listed in Table 6 below.

TABLE 6

MBs Prepared

| Example or Counter Example Number | MB Number | PE or PPA | g PE or PPA | g PEG |
|---|---|---|---|---|
| CE-1 | MB-1 | PPA-10 | 30 | 0 |
| CE-2 | MB-2 | PPA-10 | 15 | 15 |
| CE-3 | MB-3 | PPA-11 | 30 | 0 |
| CE-4 | MB-4 | PPA-12 | 15 | 15 |
| CE-5 | MB-5 | PPA-13 | 30 | 0 |
| CE-6 | MB-6 | PPA-13 | 15 | 15 |
| CE-7 | MB-7 | PPA-15 | 30 | 0 |
| EX-1 | MB-8 | PE-1 | 30 | 0 |
| EX-2 | MB-9 | PE-2 | 30 | 0 |
| EX-3 | MB-10 | PE-3 | 30 | 0 |
| EX-4 | MB-11 | PE-3 | 15 | 15 |
| EX-5 | MB-12 | PE-4 | 30 | 0 |
| EX-6 | MB-13 | PE-5 | 30 | 0 |
| EX-7 | MB-14 | PE-6 | 30 | 0 |
| EX-8 | MB-10 | PE-3 | 30 | 0 |
| EX-9 | MB-15 | PE-7 | 30 | 0 |
| EX-10 | MB-16 | PE-8 | 30 | 0 |
| EX-11 | MB-17 | PPA-14 | 30 | 0 |

MB Evaluation

Method for Measuring Ammonia Resistance

For each MB tested for ammonia resistance, a small amount of MB was placed in a desiccator over a 28% ammonia solution for 18 h. The MBs were then visually inspected for color. The results of the ammonia resistance testing are summarized in Table 7 below. The color of the MBs was white before exposure to ammonia vapors.

TABLE 7

Ammonia Resistance Characterization Results

| Example or Counter Example | MB | PE or PPA | Color after Ammonia Exposure Test |
|---|---|---|---|
| CE-1 | MB-1 | PPA-10 | White |
| CE-2 | MB-2 | PPA-10 | Dark Brown |
| CE-4 | MB-4 | PPA-12 | Light Yellow |
| CE-5 | MB-5 | PPA-13 | White |
| CE-6 | MB-6 | PPA-13 | White |
| CE-7 | MB-7 | PPA-15 | Yellow |

TABLE 7-continued

Ammonia Resistance Characterization Results

| Example or Counter Example | MB | PE or PPA | Color after Ammonia Exposure Test |
|---|---|---|---|
| EX-3 | MB-10 | PE-3 | White |
| EX-4 | MB-11 | PE-3 | Very Light Yellow |

Method for Measuring of Clearance of Melt Fracture

The melt fracture performance was tested using a 0.9 MI ZN LLDPE (Marflex 7109 available from Chevron Philips Chemicals) Trials were conducted using a Kiefel blown film line with a 40 mm, 24/1, grooved feed extruder. The die was of spiral design with a 40 mm diameter and 0.9 mm die gap (36 mil).

Testing was done by diluting the MB to a concentration of 350 ppm in the host resin at 210° C. (410° F.), 0.9 mm (36 mil) gap, 14 L/D, 10.5 kg/h (23 lb./h), and 220/s, in combination with either 6000 or 7500 ppm of antiblock, as indicated in Table 8 below, and either 1000 or 1500 ppm of slip agent, as indicated in Table 8. For Examples EX-12 through EX-14, where combinations of MBs were tested, a target total concentration of PPA was achieved by adding 10 g of one MB to achieve a target concentration of 300 ppm and 1.667 g of the other MB to achieve a target concentration of 50 ppm in the formulated resin. The MBs and their concentration in examples EX-12 through EX-14 are indicated in Table 9 below.

Every 10 min during a test a sample of film was collected. The film was examined for the presence of melt fracture, expressed as a percentage of the film area covered with MF. The time corresponding to the disappearance of the last band of MF or time to clear melt fracture was recorded (TTC), at which point the test was stopped. If any MF was remaining at the end of two h, the test was stopped and the final MF level was recorded. The results are provided in Table 10 below.

TABLE 8

| Example or Counter Example | MB or combination of MBs | Antiblock (ppm) | Slip Agent (ppm) |
|---|---|---|---|
| CE-1 | MB-1 | 6000 | 1000 |
| CE-3 | MB-3 | 6000 | 1000 |
| CE-5 | MB-5 | 7500 | 1500 |
| EX-1 | MB-8 | 6000 | 1000 |
| EX-2 | MB-9 | 6000 | 1000 |
| EX-3 | MB-10 | 6000 | 1000 |
| EX-4 | MB-11 | 6000 | 1000 |
| EX-5 | MB-12 | 6000 | 1000 |
| EX-6 | MB-13 | 6000 | 1000 |
| EX-7 | MB-14 | 6000 | 1000 |
| EX-8 | MB-10 | 7500 | 1500 |
| EX-9 | MB-15 | 7500 | 1500 |
| EX-10 | MB-16 | 7500 | 1500 |
| EX-11 | MB-17 | 6000 | 1000 |
| EX-12 | MB-10 + MB-8 | 6000 | 1000 |
| EX-13 | MB-10 + MB-13 | 6000 | 1000 |
| EX-14 | MB-12 + MB-13 | 6000 | 1000 |

TABLE 9

Concentration of MBs in examples utilizing bimodal PPAs

| Example or Counter Example | 300 ppm | 50 ppm |
|---|---|---|
| EX-12 | MB-10 | MB-8 |
| EX-13 | MB-10 | MB-13 |
| EX-14 | MB-12 | MB-13 |

TABLE 10

Clearance of Melt Fracture Results

| | Example or Counter Example | | | | | | | | | |
|---|---|---|---|---|---|---|---|---|---|---|
| | CE-1 | CE-3 | CE-5 | EX-1 | EX-2 | EX-3 | EX-4 | EX-5 | EX-6 | EX-7 |
| | | | | | | MB Number | | | | |
| Time | MB-1 | MB-3 | MB-5 | MB-8 | MB-9 | MB-10 | MB-11 | MB-12 | MB-13 | MB-14 |
| 0 | 100 | 100 | 100 | 100 | 100 | 100 | 100 | 100 | 100 | 100 |
| 10 | 100 | 100 | 100 | 100 | 100 | 100 | 100 | 100 | 100 | 100 |
| 20 | 100 | 39 | 100 | 100 | 78 | 79 | 81 | 100 | 100 | 82 |
| 30 | 98 | 14 | 100 | 97 | 34 | 54 | 51 | 100 | 100 | 52 |
| 40 | 97 | 6 | 100 | 92 | 16 | 26 | 21 | 100 | 100 | 27 |
| 50 | 94 | 2 | 100 | 78 | 9 | 18 | 12 | 100 | 100 | 19 |
| 60 | 86 | 0 | 100 | 67 | 6 | 11 | 7 | 100 | 100 | 11 |
| 70 | 74 | | 100 | 60 | 3 | 7 | 3 | 99 | 100 | 7 |
| 80 | 65 | | 100 | 49 | 1.5 | 5.5 | 1 | 98 | 100 | 5.5 |
| 90 | 59 | | 100 | 35 | 0.5 | 3 | 0 | 97 | 100 | 4.5 |
| 100 | 50 | | 100 | 22 | 0.2 | 1.5 | | 96 | 100 | 4 |
| 110 | 42 | | 100 | 17 | 0 | 0.5 | | 94 | 100 | 3 |
| 120 | 33 | | 100 | 15 | | 0 | | 93 | 100 | 2.5 |
| Final Time (TTC) | >120 | 60 | >120 | >120 | 110 | 120 | 90 | >120 | >120 | >120 |

| | Example or Counter Example | | | | | | |
|---|---|---|---|---|---|---|---|
| | EX-8 | EX-9 | EX-10 | EX-11 | EX-12 | EX-13 | EX-14 |
| | | | | MB Number | | | |
| Time | MB-10 | MB-15 | MB-16 | MB-17 | MB-10 + MB-8 | MB-10 + MB-6 | MB-12 + MB-6 |
| 0 | 100 | 100 | 100 | 100 | 100 | 100 | 100 |
| 10 | 99 | 100 | 100 | 100 | 100 | 100 | 100 |
| 20 | 59 | 100 | 100 | 100 | 83 | 88 | 100 |
| 30 | 32 | 98 | 94 | 95 | 41 | 56 | 100 |
| 40 | 20 | 87 | 87 | 79 | 24 | 34 | 100 |
| 50 | 12 | 76 | 81 | 68 | 16 | 18 | 100 |
| 60 | 10 | 66 | 73 | 51 | 12 | 10 | 99 |
| 70 | 8 | 54 | 64 | 41 | 9 | 5 | 98 |
| 80 | 6 | 45 | 60 | 30 | 7 | 3 | 97 |
| 90 | 5 | 40 | 52 | 26 | 4 | 1.5 | 96.5 |
| 100 | 4 | 35 | 46 | 22 | 1.5 | 0 | 96 |
| 110 | 3.5 | 29 | 39 | 19 | 0.5 | | 95 |
| 120 | 3 | 26 | 32 | 17 | 0 | | 93 |
| Final Time (TTC) | >120 | >120 | >120 | >120 | 120 | 100 | >120 |

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A composition comprising:
  a thermoplastic, semi-crystalline fluoropolymer comprising vinylidene fluoride units in an amount of at least 30 mole percent and tetrafluoroethylene units in an amount of at least 5 mole percent, wherein:
  (i) the vinylidene fluoride units and the tetrafluoroethylene units are present in the thermoplastic, semi-crystalline fluoropolymer in a combined amount of at least 95 mole percent, based on the total moles of the thermoplastic, semi-crystalline fluoropolymer,
  (ii) the thermoplastic, semi-crystalline fluoropolymer is free of hexafluoropropylene units or comprises less than 5 mole percent hexafluoropropylene units; and
  (iii) the thermoplastic, semi-crystalline fluoropolymer is free of perfluoroalkyl perfluorovinyl ether units and perfluoroalkoxyalkyl vinyl ether units; and
  a non-fluorinated polymer as a major component of the composition; wherein the non-fluorinated polymer comprises at least one of a polyolefin or a polyamide.

2. The composition of claim 1, wherein the amount of the vinylidene fluoride units is in a range from 30 mole percent to 95 mole percent, and wherein the amount of the tetrafluoroethylene units is in a range from 5 mole percent to 70 mole percent.

3. The composition of claim 1, wherein the amount of the vinylidene fluoride units is in a range from 70 mole percent to 90 mole percent, and wherein the amount of the tetrafluoroethylene units is in a range from 10 mole percent to 30 mole percent.

4. The composition of claim 1, wherein the vinylidene fluoride units and the tetrafluoroethylene units are present in the thermoplastic, semi-crystalline fluoropolymer in a combined amount of at least 99 mole percent, based on the total moles of the thermoplastic, semi-crystalline fluoropolymer.

5. The composition of claim 1, wherein the thermoplastic, semi-crystalline fluoropolymer further comprises units selected from the group consisting of chlorotrifluoroethylene units, trifluoroethylene units, 1-hydropentafluoropropylene units, 2-hydropentafluoropropylene units, propylene units, and combinations thereof.

6. The composition of claim 1, wherein the thermoplastic, semi-crystalline fluoropolymer has a multimodal molecular weight distribution.

7. The composition of claim 1, wherein the melting point of the thermoplastic, semi-crystalline fluoropolymer is up to 130° C., and wherein composition comprises the polyolefin.

8. The composition of claim 1, wherein the melting point of the thermoplastic, semi-crystalline fluoropolymer is at least 130° C.

9. The composition of claim 1, wherein the composition further comprises a hindered amine light stabilizer.

10. The composition of claim 1, wherein the thermoplastic, semi-crystalline fluoropolymer has an acid value of less than one milligram KOH per gram, or wherein the thermoplastic, semi-crystalline fluoropolymer has a log [zero shear viscosity/1 Pascal·second (Pa·s)] at 190° C. in a range from 4 to 11.

11. The composition of claim 1, wherein the composition further comprises a polymer processing additive synergist, and wherein the polymer processing additive synergist comprises at least one of a poly(oxyalkylene) polymer, a silicone-polyether copolymer, an aliphatic polyester, an aromatic polyester, or a polyether polyol.

12. The composition of claim 11, wherein the polymer processing additive synergist comprises the poly(oxyalkylene) polymer and further comprises a metal salt of a carboxylic acid, sulfonic acid, or alkylsulfate.

13. The composition of claim 11, wherein the polymer processing additive synergist comprises the poly(oxyalkylene) polymer and wherein the composition is lighter in color after exposure to vapors from a 28% ammonia solution for 18 hours than a comparable composition that is the same as the composition but includes a vinylidene fluoride and hexafluoropropylene copolymer instead of the thermoplastic, semi-crystalline fluoropolymer.

14. The composition of claim 1, further comprising at least one of a polysiloxane, a polydiorganosiloxane polyamide block copolymer, a polydiorganosiloxane polyoxamide block copolymer, or a silicone-polyurethane copolymer.

15. The composition of claim 1, further comprising an amorphous fluoropolymer.

16. The composition of claim 1, wherein the thermoplastic, semi-crystalline fluoropolymer has long-chain branching.

17. The composition of claim 1, wherein the composition is a packaging material for an alkaline product.

18. The composition of claim 1, wherein the thermoplastic, semi-crystalline fluoropolymer consists of vinylidene fluoride units and tetrafluoroethylene units.

19. A method of reducing melt defects during the extrusion of the non-fluorinated polymer, the method comprising extruding the composition of claim 1.

* * * * *